United States Patent [19]

Lipton et al.

[11] Patent Number: 5,193,000
[45] Date of Patent: Mar. 9, 1993

[54] MULTIPLEXING TECHNIQUE FOR STEREOSCOPIC VIDEO SYSTEM

[75] Inventors: Lenny Lipton, Greenbrae; Lawrence D. Meyer, Mill Valley; Frank K. Kramer, III, Los Gatos, all of Calif.

[73] Assignee: StereoGraphics Corporation, San Rafael, Calif.

[21] Appl. No.: 751,883

[22] Filed: Aug. 28, 1991

[51] Int. Cl.⁵ .............. H04N 13/00; H04N 13/02; H04N 13/04; H04N 15/00
[52] U.S. Cl. .............................. 358/92; 358/3; 358/146
[58] Field of Search ................ 358/92, 146, 3

[56] References Cited

U.S. PATENT DOCUMENTS

| | | |
|---|---|---|
| 3,582,542 | 6/1971 | Smierciak ............... 358/146 |
| 3,674,921 | 7/1972 | Goldsmith . |
| 3,818,125 | 6/1974 | Butterfield ............... 358/92 |
| 4,593,318 | 6/1986 | Eng ......................... 358/146 |
| 4,677,481 | 6/1987 | Nicholas .................. 358/92 |
| 4,704,629 | 11/1987 | Vreeswijk ............... 358/146 |
| 5,001,555 | 3/1991 | Park ........................ 358/92 |

OTHER PUBLICATIONS

Lenny Lipton, "Foundations of the Stereoscopic Cinema", Van Nostrand Reinhold Co. 1983, pp. 262-263.

*Primary Examiner*—Howard W. Britton
*Attorney, Agent, or Firm*—Limbach & Limbach

[57] ABSTRACT

A method and apparatus for time multiplexing and demultiplexing two channels of picture information within a standard video channel. The method is specifically designed for field sequential stereoscopic display applications, but may be used for non-stereoscopic applications where conservation of bandwidth is required. The technique is superior to prior art commercially available stereoplexing approaches, and increases vertical resolution while decreasing stair-stepping of diagonal lines. The demultiplexing display controller of the invention can be manufactured at a low cost because its design takes advantage of commercially available integrated circuits.

33 Claims, 16 Drawing Sheets

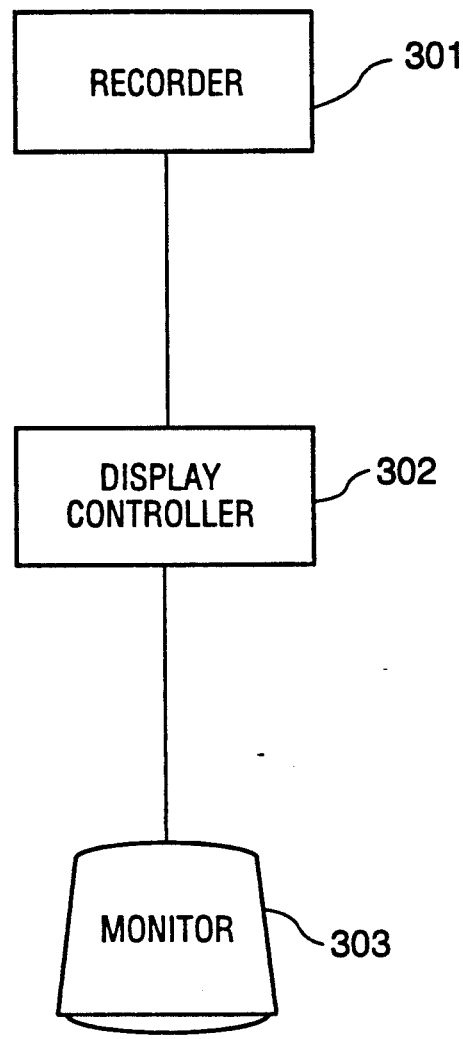
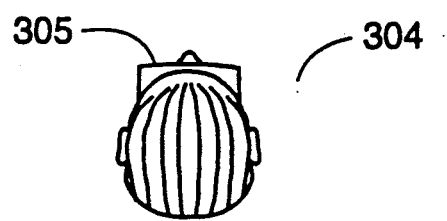
FIG. 3

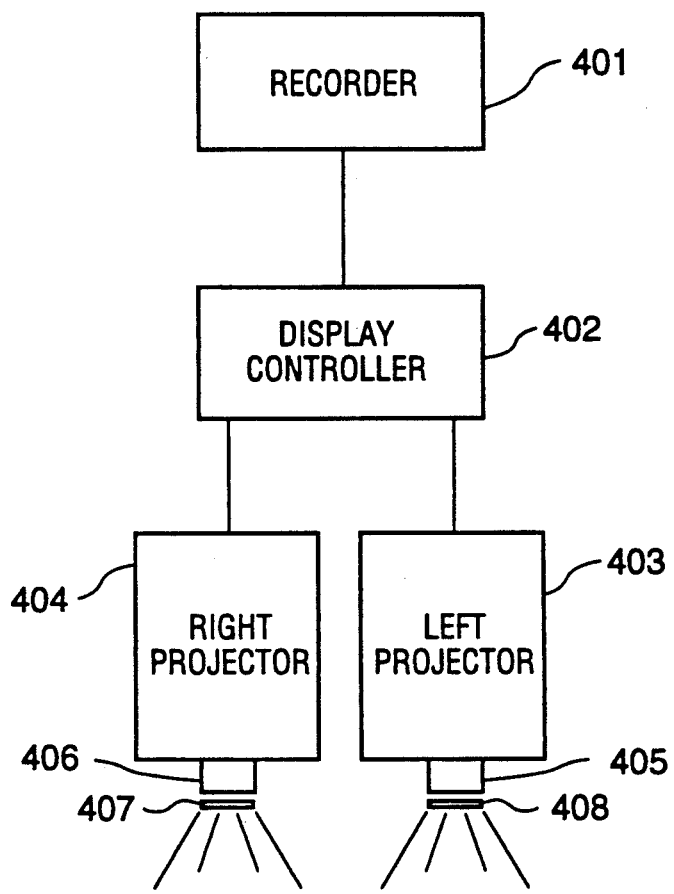
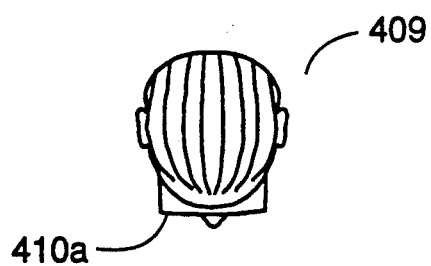
FIG. 4

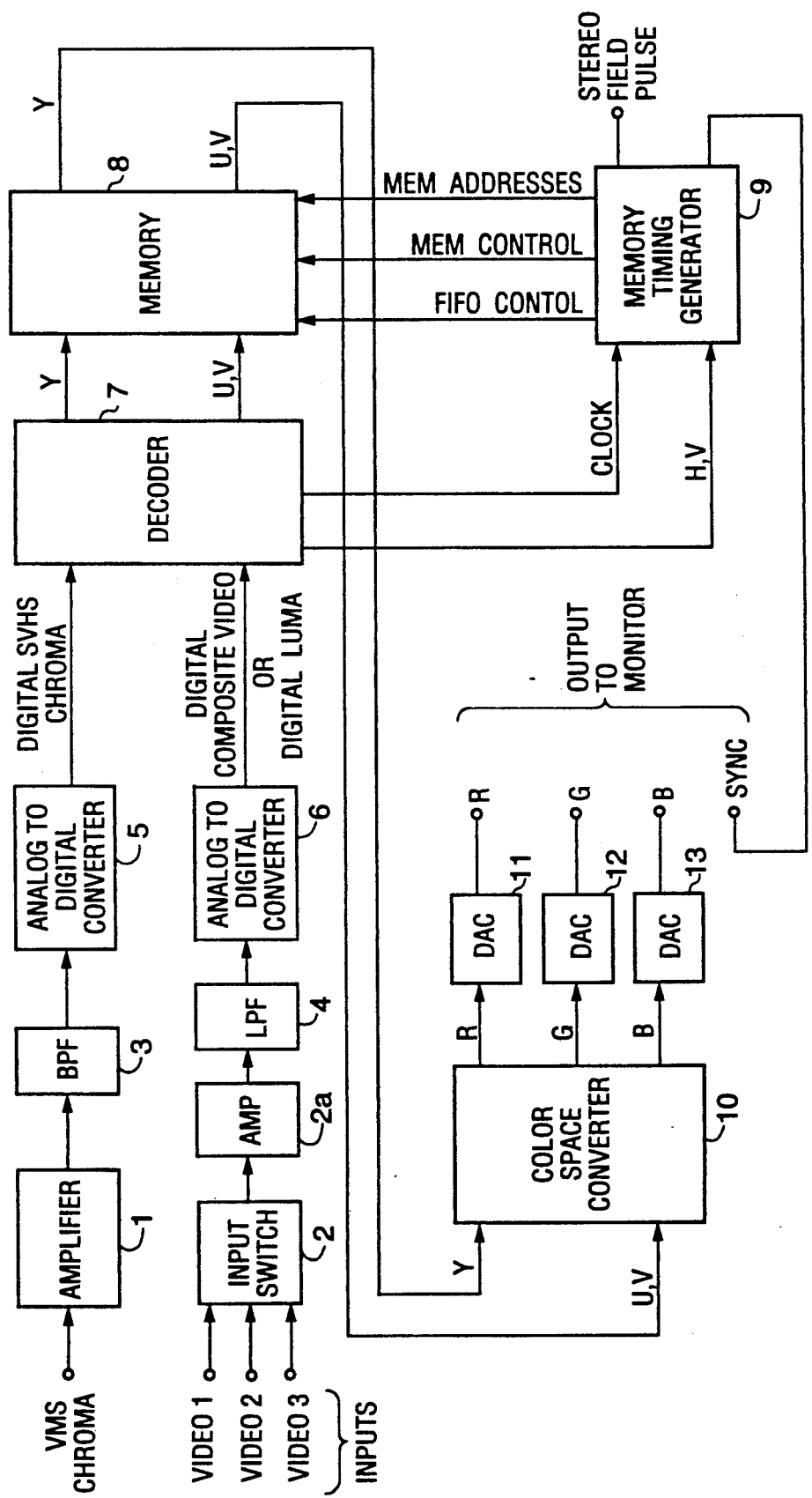

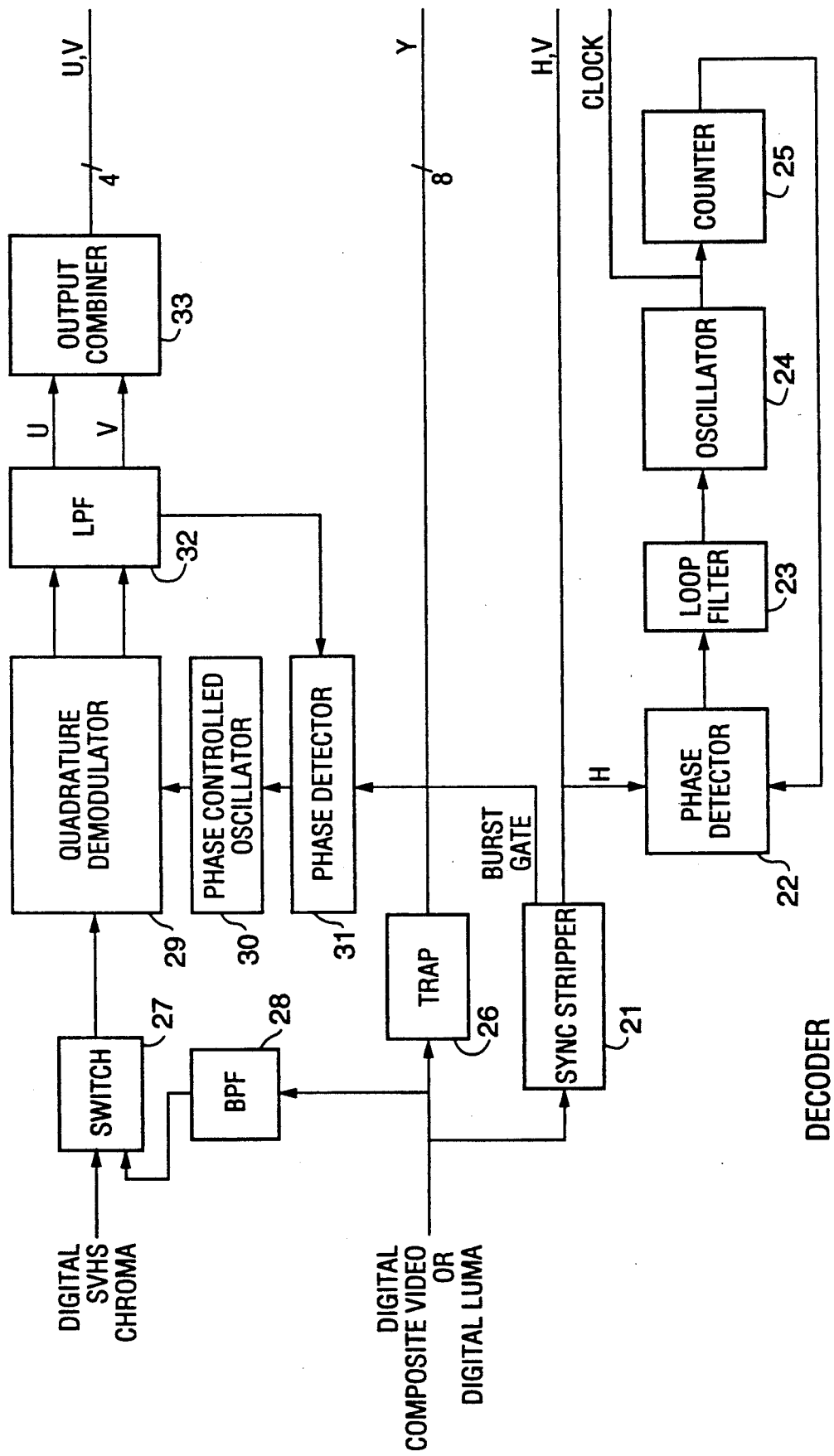
FIG. 11 DECODER

MEMORY MAP

FIELD MEMORY

MEMORY TIMING GENERATOR

SEQUENCE STARTS ON INCOMING H SYNC

| | OUTPUTS | |
|---|---|---|
| | L | R |
| INCOMING SYNC | BLACK | BLACK |
| VIDEO | INPUT | BLACK |
| ADDED DELAY SYNC | BLACK | BLACK |
| VIDEO | BLACK | INPUT |

MULTIPLEXING TECHNIQUE FOR STEREOSCOPIC VIDEO SYSTEM

FIELD OF THE INVENTION

The invention is a method and apparatus for multiplexing signals representing left and right perspective viewpoints within the existing video bandwidth to form a stereoscopic video signal. The stereoscopic video signal can be processed to produce a flickerless, field-sequential electronic stereoscopic display with good image quality. The multiplexing technique of the invention can also be used for non-stereoscopic ("planar") applications in which two distinct video programs are encoded within an existing bandwidth.

BACKGROUND OF THE INVENTION

Prior art field-sequential electronic stereoscopic video or television displays have suffered from a number of shortcomings, principally relating to high cost of manufacture and compromises in image quality. Typically, flickerless electronic stereoscopic video displays have been priced at tens of thousands of dollars. Given the approach in which the left and right images share a single channel, the resultant stereoscopic image has noticeably poorer image quality than that of one planar video image which solely inhabits the channel. Other field-sequential electronic stereoscopic video or television systems, which have a low user price, have made a serious performance compromise since they have a flickering display. While it is true that such products are attractively priced, they are not suitable for professional applications, and will have limited acceptance as an entertainment medium despite their novelty because of the obtrusive flicker.

In order for a field-sequential stereoscopic video display to be flickerless, each eye must see approximately the same number of fields in a unit of time as both eyes see in a non-stereoscopic ("planar") display. This requires a doubling of the vertical frequency, or the refresh rate. In the United States, and other NTSC countries, in which the refresh rate is approximately 60 fields/second for a standard planar video system, it is convenient to make a stereoscopic display which refreshes at 120 fields/second, rather than say, 110 or 140 fields/second, or some other arbitrary number. In this case, when using the proper selection device, each eye will see 60 fields/second. In PAL systems, which employ a standard refresh rate of 50 image fields/second, a rate of 100 fields/second is required for a flickerless stereoscopic display.

StereoGraphics Corporation produced the original flickerless electro-stereoscopic product which was first shipped in 1983, covered by U.S. Pat. No. 4,523,226, in which a form of image compression is used so that both left and right views share the existing video bandwidth. In this case the two images are squeezed by a factor of two in the vertical direction, as shown FIG. 8 of the present application. The resultant above-and-below subfields, 802 and 803, are located adjacent to each other within a single video field 801, and separated by a sub-field blanking interval, 804. These subfield images are expanded in the vertical direction upon playback and displayed at twice the field frequency. In some applications, a scan converter, or line doubler, made by JVC or Sony, has been used to double the number of lines displayed to produce a smoother appearing raster. However, this approach exacerbated the stairstepping or jaggies artifact of diagonal lines. The above-and-below sub-field technique, in the first generation of manufacture, involved a modification to cameras to allow them to function at 120 fields/second, as described in Lipton et al's U.S. Pat. No. 4,583,117.

In the second generation, a digital device, manufactured for StereoGraphics Corp. by Fortel, was used to create the vertically compressed above-and-below sub-field format, and to restore this format to a field sequential 120/fields/second display. This allowed off-the-shelf, unmodified cameras to be employed, making the system more versatile and allowing the user to select from amongst a variety of video cameras. However, the analog to digital to analog compression/decompression device was costly to manufacture, and the technique intrinsically produced artifacts, such as the aforementioned stairstepping for diagonal lines and a reduction in vertical resolution. These artifacts were visually unpleasant.

Nevertheless, the second generation product had these virtues: it worked, was recordable with standard equipment, and produced a fair quality stereoscopic image, and it was the only thing of its kind one could purchase. But the systems' image quality was not as good as a comparable planar image, especially when viewed on large screens.

Interestingly, the technique of U.S. Pat. No. 4,523,226 has become the standard approach used by most graphics computers and graphics boards manufacturers who make 120 field/second stereo-ready products. In these applications, the technique works nicely because of the greater bandwidth available in computer systems, with their greater number of lines per field, compared with video displays.

An alternative technique, which is described in U.S. Pat. No. 4,562,463, to Lipton, produces a flickerless effect for a stereoscopic image, but does so by doubling the number of fields at playback. It does not use image compression; rather the camera set-up uses a video switch to switch between the perspective viewpoints at field rate. Upon playback the fields are stored in memory and read back at twice the rate at which they were stored. If played back in the proper sequence, the result is a flickerless field-sequential stereoscopic image. In the case of Lipton et al., U.S. Pat. No. 4,523,226, the multiplexing approach is based on a compromise in terms of spatial sampling in the vertical direction, leading to a reduction in vertical resolution, with the attendant artifact of stairstepping. On the other hand, in Lipton, U.S. Pat. No. 4,562,463, a compromise has been made in sampling in the temporal domain, which may produces image jitter, and possibly spurious temporal parallax, as described in Lipton, "Foundations of the Stereoscopic Cinema (Van Nostrand, 1983).

Other field-sequential, flickerless stereoscopic systems have been demonstrated, usually at trade shows. Philips and others have shown dual bandwidth systems using interlocked laser disc players supplying left and right images to two video projectors. The polarized light method of image selection is used in such a set up.

Ikegami has shown a dual bandwidth system, based on the NTSC protocol, in which signals from two NTSC cameras are combined in a storage device and then read out at twice the rate at which they were stored. The result is a signal with twice the normal bandwidth. This device was shown the conventions of the National Association of Broadcasters and the Society of Motion Picture and Television Engineers in 1990, with a price quoted at $150,000 and an unspecified delivery date. A similar approach was employed by NHK and described in the *SMPTE Journal*, February, 1990, in an article by Isono and Yasuda, entitled "Flicker-Free Field-Sequential Stereoscopic TV System and Measurement of Human Depth Perception." In the case of the last two systems described above, no attempt was made to produce a multiplexed signal which could be transmitted over existing NTSC transmission lines or which could be used with a single NTSC recording medium such as a video tape or disc player.

Other flickerless field-sequential plano-stereoscopic systems requiring individual selection devices have been demonstrated, but with the exception of the StereoGraphics product, none have been compatible with established video protocols.

In order for a field-sequential, flickerless stereoscopic video system to be successful for industrial, scientific, education, and entertainment uses, it must be compatible with the existing protocol and hardware infrastructure vis-a-vis cameras, transmission, recording, playback, and post-production. For example, it must operate with a single recorder rather with two electronically interlocked machines, as is the case for the Ikegami system mentioned above. Moreover it must not be priced a great deal more than a planar video system used for the same application. For example, if a teleoperations system is used in an underwater remotely operated vehicle, and a typical video system is priced at $15,000, it is unlikely that users will spend $150,000 or even $40,00 for a substitute stereoscopic video system, whatever its performance.

There is a distinction that must be made between upwardly and downwardly compatible stereoscopic video systems which involves multiplexing techniques, discussed in "Compatibility of Stereoscopic Video Systems with Broadcast Television Standards," by Lipton in SPIE, Vol. 1083, 1989. In the systems described in cited U.S. Pat. Nos. 4,523,226 and 4,562,463, no attempt was made to produce a downwardly compatible product. These systems are not downwardly compatible in the sense that their transmitted or recorded signals, when played back on a conventional monitor, will result in images appearing to be compressed or scrambled. An example of a downwardly compatible approach is the NTSC colorplexing protocol in which color information is added to the existing black-and-white transmission allowing black-and-white sets to receive a color signal which can produce an image of unimpaired quality. NTSC color information is transparent to monochrome sets, but to a color set the information produces a color image.

Suggestions for downwardly compatible stereoscopic video systems have been made by several workers, including Yoshimura in U.S. Pat. No. 4,772,944, and Yamada in U.S. Pat. No. 4,743,965. However, a study of these multiplexing techniques reveals that, while possibly downwardly compatible vis-a-vis existing receivers or transmission systems, they would not result in signals which could be recorded or played back on most conventional video tape recorders or laser disc players. The additional information required for the reconstruction of the complete stereoscopic image might be beyond the capability of professional high bandwidth recorders. It would be necessary to produce a new type of video tape recorder to take into account the stereoplexed information. This would impose an enormous burden on consumers because tens of millions of video tape recorders are in their hands. The concept of compatibility, in this the age of the consumer video tape recorder, takes on additional complications that did not exist at the time of the introduction of the downwardly compatible colorplexed video protocols now employed throughout the world. As a matter of fact, the video tape recorders which have been introduced subsequently have had to take into account the additional color information and make special provision for its recording.

Today, the compatibility requirements are more severe than in prior years, and it may well be technically impossible to create a stereoscopic multiplexing technique which is compatible with the entire video infrastructure, which incorporates stereoscopic information which is transparent to existing receivers.

We expect that the upwardly compatible invention of the present disclosure will meet the requirements of the marketplace by producing a multiplexed video signal which can be displayed as a stereoscopic image of high quality, and which can be recorded and played back on existing professional and consumer video recorders and laser disc devices. The multiplexed video signal of the invention may be distributed by existing transmission schemes including satellite broadcast, through-the-air broadcast, and cable distribution.

Despite the fact that the multiplexed signal of the invention appears as a compressed or scrambled image when displayed on a non-stereoscopic ("planar") monitor, it may still be viable as a consumer product. These days there are many more means for delivering a video signal than in the days when color television was introduced. Then only VHF broadcast channels were available. Now there is also UHF, cable, home video tape recorders (VTRs), and the possibility of satellite broadcast. With so many more channels or means of distribution of video programs, there is the distinct possibility that a portion of some of these means might be dedicated to stereoscopic video.

The issue of downward compatibility is of less importance in an industrial, scientific or military application than it is in a consumer application, but it is a matter that needs to be considered.

There are many applications for a stereoscopic video system in industry, science, medicine, education, and the military. These users may be willing to pay more than home users for such capability, but eight years of experience of marketing such products indicate that they are not willing to pay a lot more. These days closed circuit color television systems using solid state cameras and good quality monitors have reached a high level of performance and image quality, at a low price.

Therefore it is desirable to design a field-sequential stereoscopic television system whose signal can be sent over a transmission line with no more bandwidth than that allocated for a planar signal, and can be recorded on an unmodified video tape recorder, so that the recorded signal may be played back on a stereo-ready television set or monitor. The stereoscopic images must be more or less subjectively equivalent in image quality to a normal planar video display. That means that each of the two perspective views must have more or less the same image quality as a non-stereoplexed planar image. This must be accomplished at a reasonable cost of manufacture and sale price.

Various multiplexing techniques have been employed to incorporate additional video information within a single channel. One such product, known as the Comband system, was announced in the 1980's by General Electric, and is still offered by the Comband Company. The Comband system embodies a multiplexing technique of the type described in U.S. Pat. No. 4,533,936, to Tiemann, et al. The system uses a complex scheme in which the luminance signal is filtered to two and a half megahertz, or approximately half that of the normal NTSC bandwidth. An additional channel is added to the signal, and it is also compressed. The product allows a doubling of the number of channels available in a cable system.

Yet another approach is one which is described by G. R. Kennedy in "Weather Satellite Picture Processor," Wireless World, Vol. 86, 1980, No. 1533, in which two channels are incorporated within a single video field. In this case the images are located side-by-side, but there is no compression, and the images maintain their usual aspect ratio. Apparently this approach was used for convenience to save bandwidth and also to allow for fax transmission in certain circumstances.

Compression in the time domain has been used. One example of this is described in U.S. Pat. No. 4,027,333 to Kaiser et al., in which alternate fields are encoded with alternate images. The images are then separated on an alternate field basis, and interpolation is used to synthesis missing field information. This device was developed at C.B.S. Labs and then by Thompson CSF. It was also part of a system discussed by Liston Abbott in an article in the February, 1979 SMPTE Journal, Volume 88, entitled "Transmission of Four Simultaneous Television Programs Via A Single Channel." Multiplexing in the time domain may be the most costly approach.

SUMMARY OF THE INVENTION

The invention is a method and apparatus for multiplexing and demultiplexing two channels of picture information within a standard video channel. The method is specifically designed for field sequential stereoscopic display applications, but may be used for nonstereoscopic applications where conservation of bandwidth is required. Embodiments of the invention are compatible with a variety of conventional video protocols, including the commonly employed NTSC and PAL broadcast standards, and any newly introduced so-called high definition TV standard. Computer graphics images may also be stereoplexed by using the inventive technique.

The inventive system can also produce a two projector stereoscopic display, or two channels of independent non-stereoscopic (planar) displays.

The present disclosure, while teaching the techniques of the overall system, teaches display (or playback) aspects of the invention in particular detail. The cost of manufacturing the inventive hardware (for implementing the inventive technique) is lower than the cost of manufacturing prior art devices, in part because the inventive design takes advantage of commercially available integrated circuits. Moreover the invention can achieve image quality superior to that which can be achieved using prior commercially available stereoplexing hardware because the invention results in improved vertical resolution and does not exacerbate the stairstepping of diagonal lines.

When displayed on a conventional non-stereoscopic monitor, the stereoscopic video signal of the invention results in image pairs that are digitally squeezed and located side-by-side within the usual field area. The signal can be digitally processed to unsqueeze and demultiplex the images to restored them to an analog field sequential format suitable for display on commonly available stereo-ready computer graphics monitors.

The invention is video protocol independent, but specific embodiments described herein can be used with conventional recording, playback, and display hardware that implements the NTSC (or PAL) protocol.

BRIEF DESCRIPTION OF THE DRAWINGS

FIG. 3 is a block diagram of a standard video tape recorder feeding a stereoplexed signal to a display controller which in turn feeds a stereoscopically formatted signal to a stereo-ready monitor.

FIG. 4 is a block diagram of a standard video tape recorder feeding a signal to a display controller which in turn provides independent left and right signals at the usual refresh rate. The left and right signals are fed to left and right video projectors for projection of stereoscopic images using the polarized light method of image selection.

FIG. 10 is a block diagram of a preferred embodiment of the inventive playback controller, showing the major processing sections.

FIG. 11 is a detailed block diagram of the decoder of the controller of FIG. 10. The decoder transforms the composite or SVHS video into Y,U,V components and extracts timing information.

DESCRIPTION OF THE PREFERRED EMBODIMENT

Figure 1A:
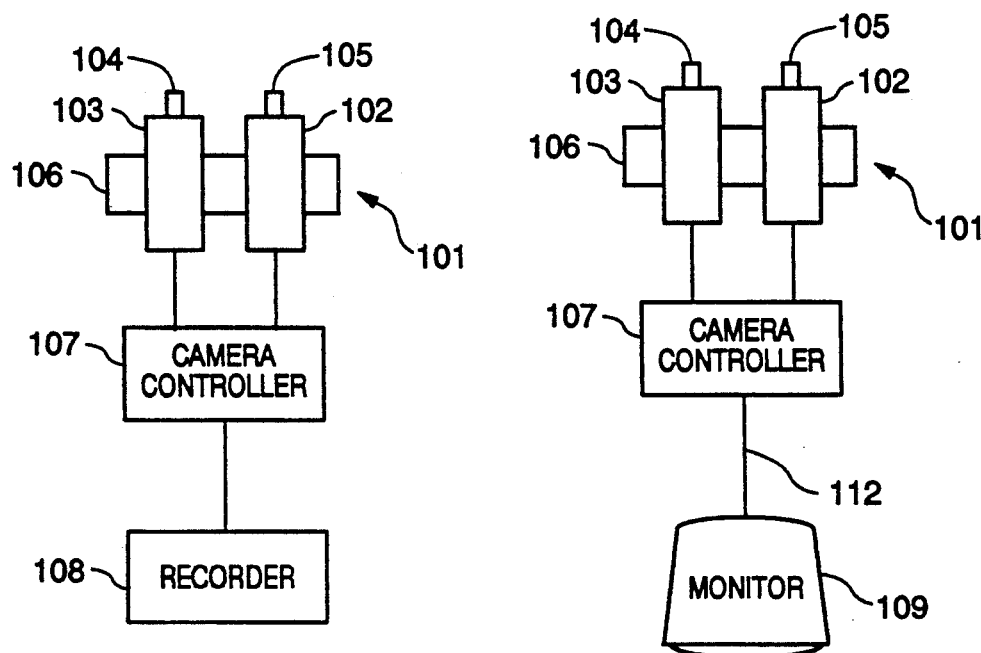
FIG. 1A is a block diagram of a stereoscopic video camera, with left and right heads mounted on a base, and a camera controller for multiplexing the output of the left and right heads. The multiplexed output of the controller can be recorded by a normal bandwidth recorder.

FIG. 1A shows a basic layout of an electronic stereoscopic camera system which embodies the invention. Electronic camera 101 of FIG. 1A is made up of two video cameras (or "heads") 102 and 103, having lenses 105 and 104, respectively, each of which is used to capture its perspective point of view. Heads 102 and 103 are mounted on a base 106, and can be standard unmodified PAL or NTSC protocol video cameras. For the some of the discussion below, for didactic purposes, and without loss of generality, the invention will be discussed in the context of the NTSC system. The signals from cameras 102 and 103 are fed to camera controller 107.

A detailed description of how the two signals are processed within controller 107 will be provided below. In general, the two signals are stored in memory and operated on topologically to produce a multiplexed signal which would have the appearance shown in FIG. 2 if displayed on a conventional planar monitor. The multiplexed signal asserted by controller 107 can be recorded and played back on standard recorder 108. When the signal from recorder 108 is played back through the display controller 302 of FIG. 3, it is at twice the usual vertical frequency (i.e., twice the usual NTSC vertical frequency). The played back signal is expanded and demultiplexed to put it into the field sequential format diagrammatically depicted in FIG. 6A.

Figure 1B:
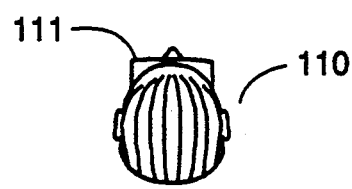
FIG. 1B is a block diagram similar to FIG. 1A, which shows the camera controller feeding a monitor directly, rather than a recorder. The left and right channels can be compressed to the bandwidth of a single planar channel, or the fields can be formatted for alternate field stereoscopic display without bandwidth compression.
Figure 1C:
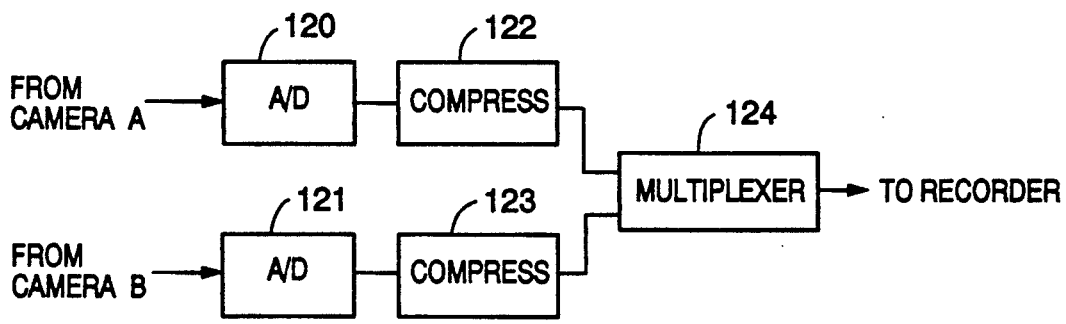
FIG. 1C is a simplified block diagram representing the camera controller of FIG. 1A.

FIG. 1C is a simplified block diagram representing camera controller 107 of FIG. 1A. Analog video signals from camera 102 (identified as camera A in FIG. 1C) and camera 103 (identified as camera B in FIG. 1C) are digitized in analog-to-digital converters 120 and 121, respectively. Compression means 122 horizontally compresses each line of the digital output of circuit 120, and compression means 123 horizontally compresses each line of the digital output of circuit 121. Time-division-multiplexing means 124 time-division-multiplexes the output signals asserted by circuits 122 and 123. The data stream asserted at the output of multiplexing means 124 represents Video lines having the format shown in FIG. 9B. Thus, the output data stream asserted by means 124 comprises one or more lines, each of which lines has a first portion representing a compressed line of the output of camera A, and a second portion representing a compressed line of the output of camera B (the second portion is concatenated with the first portion).

In FIG. 1B, camera controller 107 outputs a live signal for display (rather than a signal to be recorded) to a stereo-ready monitor 109, which is viewed by observer 110 using selection device 111.

To take full advantage of the case that communication link 112 (which can be a transmission line) can transmit a signal of twice the usual video bandwidth, camera controller 107 (in the FIG. 1B embodiment) is preferably designed to operate in a mode in which it outputs a signal having twice the usual video bandwidth. In this mode, the signals from camera heads 102 and 103 are stored in controller 107, and are read out (from memory within controller 107) alternately at twice the speed or rate at which they were written into the memory. In this case (unlike in the FIG. 1A embodiment in which the signal asserted at the output of controller 107 has the usual bandwidth), the signal output from controller 107 has no bandwidth compression (unlike the displayed signal shown in FIG. 2), and the controller 107 outputs twice as much information as in the FIG. 1A embodiment (since there is no compression of information along a horizontal line).

Figure 1D:
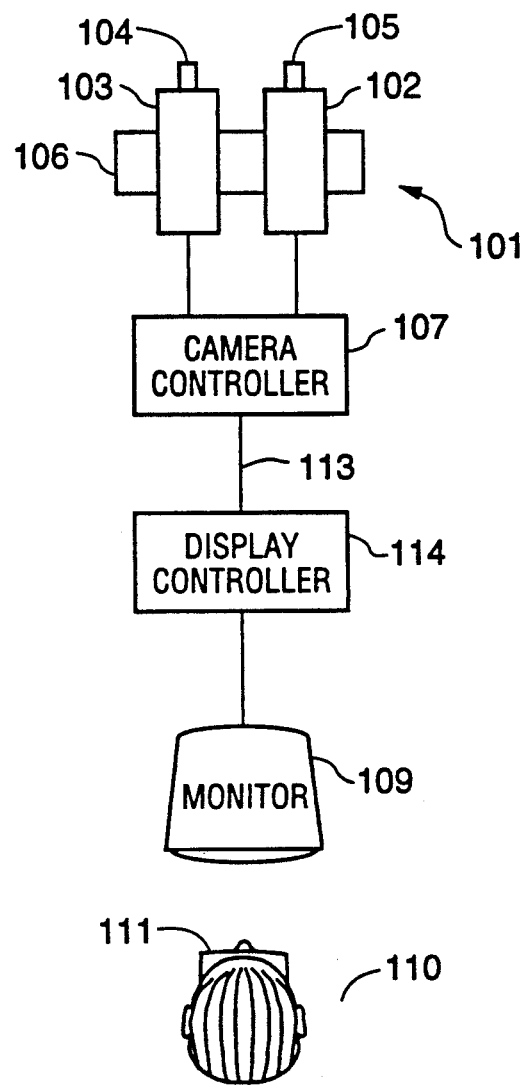
FIG. 1D is a block diagram of a live video communications link using the cameras and controllers shown in FIGS. 1A and 1B.

With reference to FIG. 1D, for operation with a live video link 113 of a type incapable of transmitting signals of more than the usual video bandwidth, controller 107 should be capable of operating in a mode in which it transmits a signal having the usual video bandwidth (as does controller 107 in FIG. 1A). In this mode, the output of controller 107 includes less information than the combined output of cameras 102 and 103 (i.e., when displayed on a conventional monitor, each field of the output of controller 107 would have the appearance of two side-by side images as in FIG. 2, but each of these two images would have only about half the information of a conventional field). In both this mode and the mode described in the previous paragraph, however, the video ultimately displayed has twice the normal horizontal frequency (for example, in an NTSC compatible version, about 31.5 KHz, instead of the usual planar NTSC horizontal frequency of about 15.7 KHz).

Figure 2:
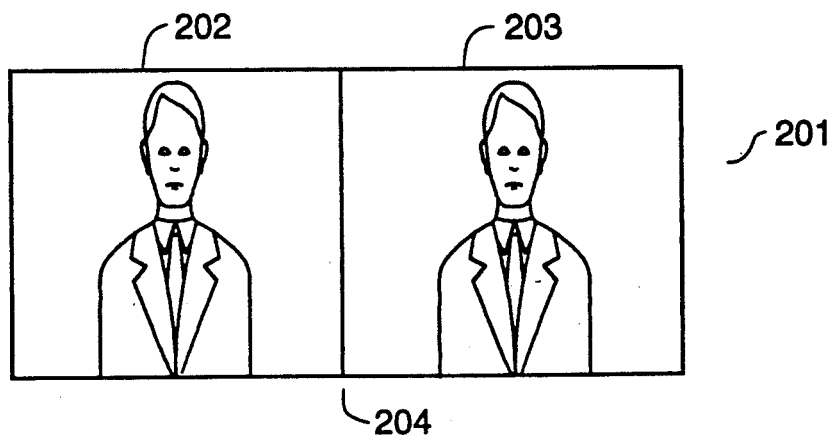
FIG. 2 shows vertically compressed sidefields of the multiplexed video signal of the invention as they would be seen if the signal was played back on an unmodified non-stereo-ready monitor.

In FIG. 3, display controller 302 receives multiplexed video signals (for example, signals encoded with topologically transformed and multiplexed images of the type depicted in FIG. 2) that are played back from standard video recorder 301. Controller 302 demultiplexes the played back signals for display on monitor 303, for viewing by a user 304 equipped with selection device 305.

Display controller 302 is capable of demultiplexing video signals produced by the camera controller 107. Thus, the signals displayed on monitor 303 will have reduced information along a horizontal line, although the video presented to monitor 303 has a horizontal frequency (for NTSC) of 31.5 KHz, rather than the usual planar 15.7 KHz. As will be described below with reference to FIG. 2, the display controller produces field sequential video at twice the vertical frequency from the camera controller signal.

If the bandwidth of the signal played back by recorder 301 is kept to that of the usual video protocol (i.e., NTSC) and not expanded, the system maintains signal compatibility with the conventional video or television infrastructure. The means by which this is accomplished using controller 302 is the subject matter of a preferred embodiment of the invention.

In accordance with the invention, left and right fields outputted by two video cameras (which comprise a stereoscopic video camera) are squeezed (compressed) by a factor of two, in the horizontal direction. We shall call the squeezed or compressed images "sidefields." The compressed fields (sidefields 202 and 203 shown in FIG. 2) are located side-by-side within a conventional field area (201 in FIG. 2). Boundary 204 between the sidefields (shown in FIG. 2) is not devoted to horizontal blanking, since this would reduce the resolution along a line. If such topologically transformed multiplexed images are played back on a conventional planar monitor, they will appear to be side-by-side and squeezed in the horizontal direction by a factor of two (as shown in FIG. 2).

Figure 6A:
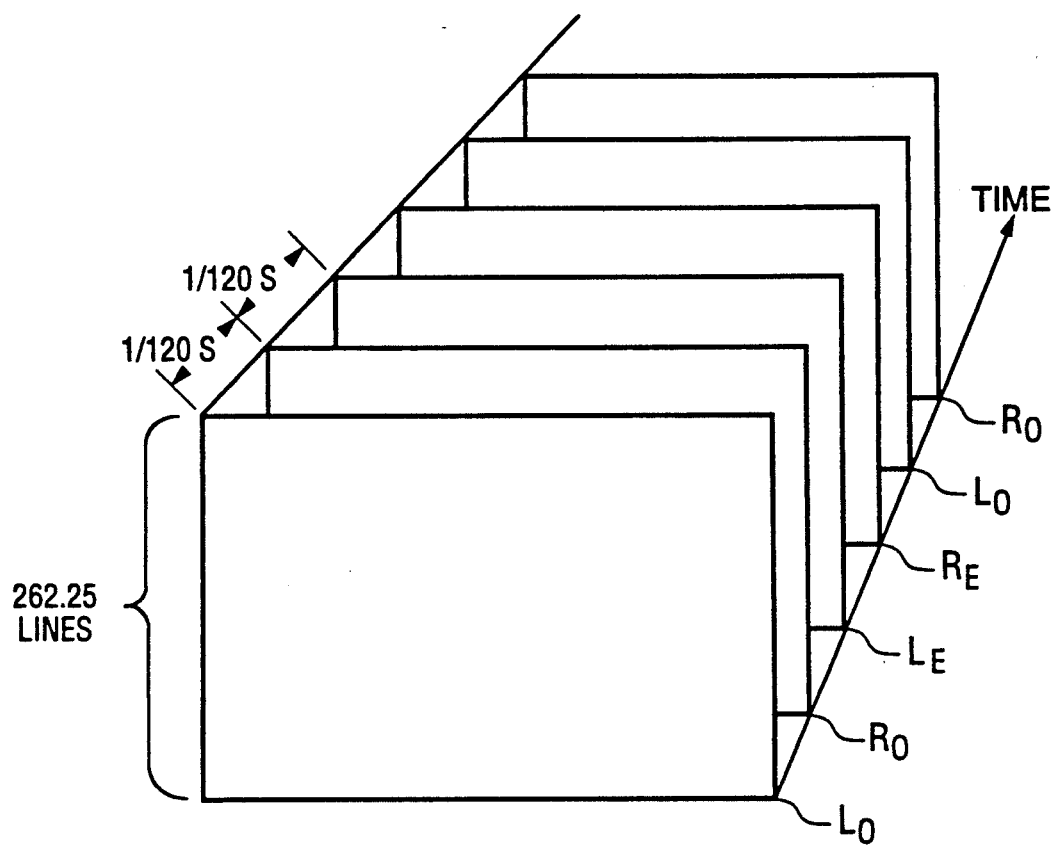
FIG. 6A is a diagram representing a stereoscopic video signal format compatible with the NTSC protocol, with a 4-fold interlace with 262.25 lines/field, and a rate of 120 fields/second.

If a controller is used to unsqueeze (expand) and demultiplex the signal before it is displayed on a monitor, the controller can organize the signal to produce a sequence of fields suitable for the display of a stereoscopic video image. In such a case the fields will have been expanded to normal proportion or aspect ratio, and the left sidefields and right sidefields rather than being juxtaposed spatially, will now be juxtaposed temporally and repeated in sequence. This sequence is as follows: left odd, right odd, left even, right even . . . ad infinitum, as will be discussed more fully later in this specification (and as illustrated diagrammatically in FIG. 6A with specific reference to the NTSC protocol). In FIG. 6A, the left odd, right odd, left even, right even fields are labeled $L_O$, $R_O$, $L_E$, $R_E$, respectively.

Persons of ordinary skill in the art will understand that the technique described herein will work with other video protocols such as the European PAL system, that the terms odd and even refer to the interlace characteristics of the video image, and that the terms left and right refer to the perspective viewpoints photographed by the video cameras. A four-fold interlace is employed, as was employed in the implementation in above-referenced U.S. Pat. No. 4,523,226, and described in the "A Time-Multiplexed Two-Times Vertical Frequency Stereoscopic Video System", by Lipton and Meyer, SID 84 Digest. There are alternatives to a four-fold interlace, as is described in granted U.S. patent application Ser. No. 07/595,595, such as a dual two-fold interlace. Although the four-fold interlace approach is described in detail, the invention is not limited to this approach and may be implemented with other types of interlace, or with non-interlace or progressive scan.

Persons of ordinary skill in the art will have no difficulty in understanding how the method described in the present specification can be applied to non-interlaced or progressively scanned video or computer graphics images. However, the NTSC and PAL video protocols which are of greatest concern from a commercial point of view, use the interlace mode.

In the FIG. 4 embodiment, an alternative embodiment to the time-sequential scheme given above, two separate, parallel, output video channels are produced, one for a left projector and the other for a right projector. Display controller 402 receives a signal (a signal multiplexed in accordance with the invention) from recorder 401, and processes the signal to produce two parallel channels of left and right picture information. This outputting of two standard video channels allows the use of two video projectors 403 and 404, with lenses 405 and 406, for projection of images with the polarized light method of image selection. Polarizing filters 408 and 407 impose different polarization characteristics on the light projected from projectors 403 and 404 onto screen 410. The latter technique is well known in the motion picture industry and described in Lipton's "Foundations of the Stereoscopic Cinema" (Van Nostrand Reinhold, 1982). It is necessary to use a screen 410 which has a metallic surface which may conserve polarization, so that a proper stereoscopic image may be seen by the observer 409 who is wearing polarizing spectacle selection device 410a.

Figure 5:
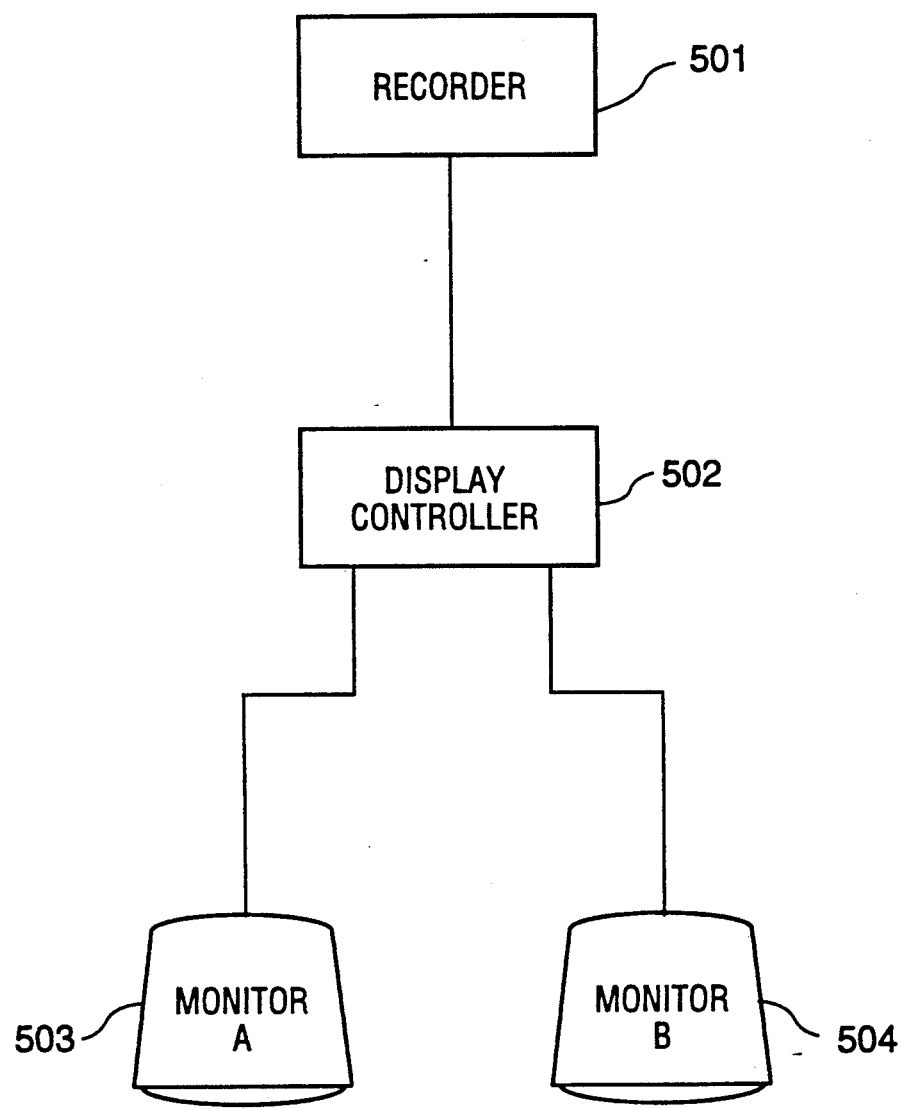
FIG. 5 is a block diagram of a standard video recorder feeding a signal to a display controller which in turn provides independent channels A and B for display of two programs on individual monitors.

A different application for the inventive technique of simultaneous rather than the sequential presentation of two channels will next be described with reference to FIG. 5. The technique is the encoding of two independent planar channels on a single tape, or the playback and transmission of such multiplexed signal over a single transmission line. The technique can double the number of programs available within a given channel, or allow for user selection between two channels in an interactive mode. As shown in FIG. 5, recorder 501 provides a multiplexed signal (of the type described above in this paragraph) to display controller 502. Controller 502 demultiplexes the two images (image A and image B), for separate display on standard planar monitors 503 and 504 (with monitor 503 displaying image A and monitor 504 displaying image B).

In stereoscopic applications, the camera controller of the invention (i.e., controller 107 of FIG. 1A, 1B, or 1D) receives signals from left and right cameras (or camera heads), and is capable of generating an output signal compatible with a conventional video protocol by multiplexing the two input signals. This allows recording or transmission of the multiplexed signal with existing hardware. The camera controller (multiplexer) produces images ("sidefields") which are squeezed (compressed) horizontally and placed side-by-side to conform to the requirements of a video field of a given protocol. FIG. 2 shows a pair of such sidefields.

Figure 6B:
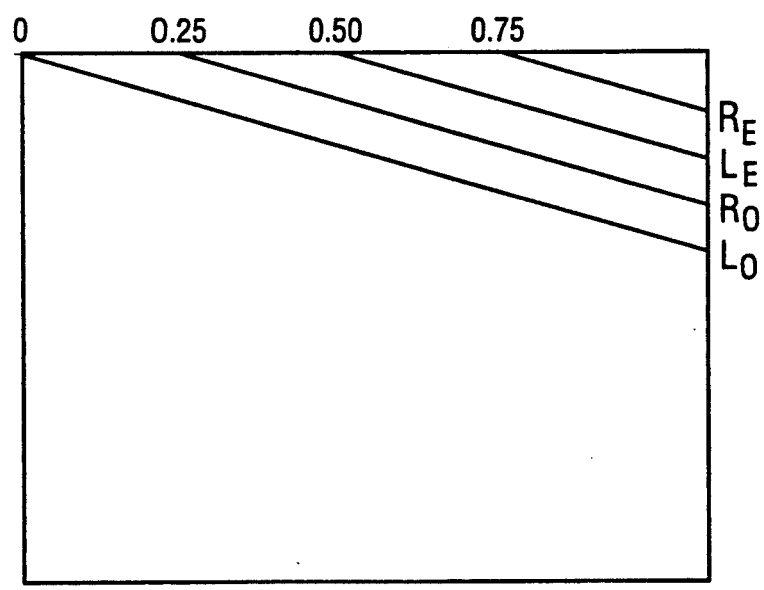
FIG. 6B represents the 4-fold interlace scheme employed in the FIG. 6A format.

The playback controller of the invention (i.e., controller 302 of FIG. 3) operates on the stereoplexed signal to read out the sidefield lines in the sequence described above. If the stereoplexed signal has NTSC format, the first set of lines to be displayed are 262.25 lines of, let us say, the first left field. Then the adjacent right field is read out, and subsequently the process continues, ad infinitum, for additional fields, as shown in FIG. 6A. Each field is 120th of a second, and the sequence of fields in the time domain is described above, and shown in FIG. 6A. The first and last line of each field must begin (and end) at one of the "0," "0.25," "0.50," or "0.75" positions of a conventional horizontal line, in order to create the necessary 4-fold interlace, as shown in FIG. 6B.

Each eye of a viewer, when looking though a selection device sees only its right or left lines, and successive fields for each eye form a 2-fold interlace. This interlace pattern conforms to the format presently employed in the display of planar video images.

Horizontal sync pulses between the sidefields must be omitted from the signal asserted at the output of the inventive camera controller, because video tape recorders must see sync pulses only at the end of a line. Thus, we omit the horizontal sync blanking area and pulses between sidefields, as mentioned above and shown in FIG. 2. Therefore, the sync pulses separating the sidefields are added by the playback controller to conform to the desired video protocol and to enable the monitor to lock to the lines of the field. We also omit any sidefield horizontal blanking area in order to increase the image resolution.

By way of reference, the NTSC protocol consists of 525 lines at a line rate of 15.75 KHz, made up of approximately sixty 2-fold interlaced fields/second. or 30 frames/second. A stereovideo signal based on this protocol outputted by the inventive playback or display controller is made up of 120 fields/second with a line rate of 31.5 KHz with 262.25 lines/field to produce a 4-fold interlace, as illustrated in FIGS. 6A and 6B. The result then is a sequence of stereoscopic fields of 262.25 lines in a 4-fold interlace in the following sequence: left odd, right odd, left even, right even. . . .

Figure 7:
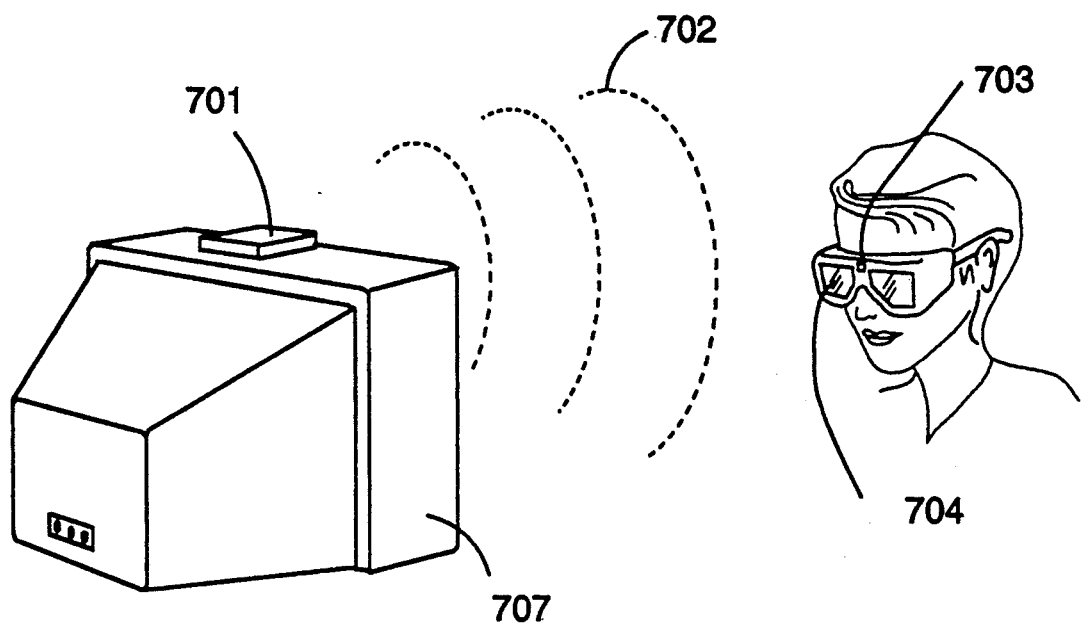
FIG. 7 is a perspective view of the conventional device known as the CrystalEyes selection device, which is used to view stereoscopic images.

When the images are viewed through an appropriate selection device, as described in U.S. Pat. Nos. 4,967,268 and 4,884,876 (Lipton, et al.), and illustrated in FIG. 7, the result is that each eye sees its and only its appropriate sequence of fields. The CrystalEyes® selection device 704 (shown in FIG. 7), described in these two patents and manufactured by StereoGraphics Corp., uses liquid crystal shutters which open and close in synchrony with the video field rate displayed on monitor 707, so that each eye sees alternate images. Synchrony is maintained between the video source and the eyewear by means of infrared emitter 701. The infrared signal is sensed by a sensor 703 mounted on the eyewear. This is one image selection technique that has been employed commercially, but others exist such as that described in U.S. Pat. No. 4,792,850 (Lipton, et al.) and also manufactured by StereoGraphics Corp. The present invention is independent of the particular selection technique employed, and will work with any properly engineered individual shuttering selection device.

When the demultiplexed signal of the invention is displayed, each of the viewer's eyes will see a 2-fold interlaced frame of approximately 480 visible lines. Each eye will see alternately an image field of the proper perspective followed by a blank interval of no image of the same duration as an image field, followed by an image field, and so on. The other eye is seeing the same sequence with the image fields and blank portions out of phase with the first eye. If the fields are properly prepared and presented, the eyes and the brain are able to synthesize a flickerless image with both motion and the depth sense stereopsis out of this succession of left and right fields, alternated by intervals with no image.

The multiplexing technique of the invention produces images which are, for the great majority of subjects videographed, all but indistinguishable from conventional NTSC images. That is to say, a planar NTSC image has a given quality, and both left and right images resultant from the inventive stereomultiplexing and demultiplexing technique will produce images which are more or less the equivalent of a conventional planar image. In comparison testing, rapidly shifting between two images, compressed and then uncompressed, versus the same image which had not been processed, for the great majority of images, it was virtually impossible to tell the difference between an original image, and a compressed and uncompressed version of the image. An expert observer had to be several inches from the display screen before relatively minor differences in edge sharpness could be seen.

In a comparison between the inventive side-by-side squeezing multiplexing technique, and the vertical compression technique described in above-referenced U.S. Pat. No. 4,523,226, the approach of the present invention produced a substantial improvement in quality. The prior vertical compression technique produced images which were degraded compared to the inventive horizontal compression technique.

The explanation for this result is that video scanning, or sampling, of an image is analog (i.e, more or less continuous) in the horizontal direction, but discrete in the vertical direction. Since the direction of scanning is horizontal, horizontally adjacent image points may have a continuum of information between them, whereas vertically displaced image points must exist in strictly quantized positions. It is not possible to record information between adjacent scanning lines, and while the ability to resolve detail along a horizontal scanning line is finite, in this direction the resolution capacity is very much greater.

We live in an age in which video images are described and analyzed in terms of picture elements or pixels. This is a practice which was adopted from the computer graphics industry and is appropriate in that field since the calculation of images is indeed based upon individual pixels. However, such an analysis falls short of the mark when applied to video, since video is an analog medium. This is understood and appreciated by video engineers who use modulation transfer techniques for image quality analysis.

The transmission or storage of detail along a horizontal line of a video signal is an analog function, and is best described in analog terms or according to modulation transfer function, bandwidth, or similar means of analysis. There is a great deal of information in a horizontal line, and it is not easily quantifiable into pixels. The horizontal compression technique of the invention takes advantage of this and is able to produce an image which, for most subjects, subjectively appears to be virtually as sharp, upon decompression, as a comparable conventional planar image which occupies the entire field.

The inventive camera controller can operate in another mode without image compression for "live" video as shown in FIG. 3. In this case it can accept two signals from the two video camera heads of a stereo camera rig and, in response, output the following sequence of image fields: left odd, right odd, left even, right even, and so on, without any loss of bandwidth or picture information. Instead of horizontally compressing each line or field, the controller (302) can operate in a mode in which it speeds up the display of each field to twice the rate at which it was scanned. In this way the bandwidth of each video camera head's output may be preserved. Such an approach is ideal for closed circuit television where it is not necessary to record the signal and where twice the bandwidth is available.

We next describe a preferred embodiment of the inventive display (and playback) controller. Those of ordinary skill in the art will appreciate that there are other circuits or architectures embodying the invention which could be substituted for the display controller described in detail below.

The playback controller can output a field sequential stereo signal from a horizontally compressed video signal. The playback controller performs this transformation on video signals which are compatible in all respects with NTSC or PAL except that the horizontal picture information is compressed by a factor of two, and is time multiplexed with information from two camera sources.

Figure 9A:
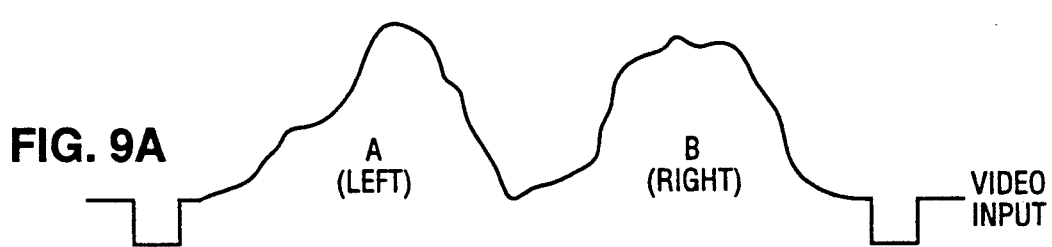
FIG. 9A represents a horizontal line of an input video signal multiplexed in accordance with the invention. The left half of the signal is a 2:1 time compressed signal from camera A. The right half of the signal is a 2:1 time compressed signal from camera B.
Figure 9B:
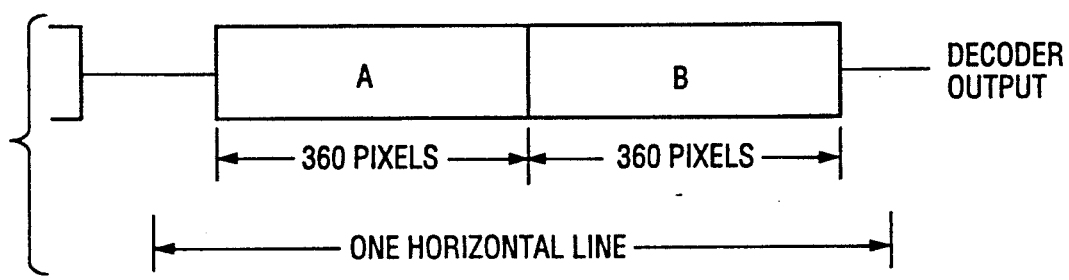
FIG. 9B represents the signal of FIG. 9A after digitization. The A and B signals are digitized into 360 pixels each. The horizontal sync interval is not used.

The horizontal video line shown in FIG. 9A represents the output of the inventive camera controller. As shown in FIG. 9A, the signal in the first half of the line is provided by the left camera, and the signal in the right half of the line is provided by the right camera. FIG. 9B represents the output of the decoder (i.e., decoder 7 in FIG. 10).

The video signal output from the controller is compatible with NTSC and PAL standards, including the number of lines per field and the method of modulating the chroma onto a subcarrier. In addition to standard composite signals, the unit accepts the SVHS Y/C format.

The display (and playback) controller shown in FIG. 10 accepts input signals from either composite or SVHS sources in NTSC or PAL formats. Composite sources are connected to the "Video 1" and "Video 2" inputs of input switch 2. For component video input formats, the luminance component is connected to the "Luma" input of switch 2, and the chroma component is connected to the "Chroma" input of chroma input amplifier 1.

After passing through input switch 2, the composite video or luma signal is buffered in buffer amplifier 2a, and low pass filtered in filter 4 to remove high frequency information which would cause aliasing artifacts. The resulting low pass filtered composite video (or luma) is then converted from an analog signal to a digital data stream in A/D converter 6. Similarly, after the chroma signal is buffered by chroma buffer amplifier 1, it is bandpass filtered in circuit 3 to remove unwanted frequencies. The filtered chroma output from circuit 3 is converted from an analog signal to a digital signal in A/D converter 5.

In a preferred implementation, composite input switch 2, amplifier 2a, and analog to digital converter 6 are contained within a Philips TDA8708 video analog input interface chip. Chroma input amplifier 1 and analog to digital converter 5 are contained within a Philips TDA8709 video analog input interface chip.

The resulting digital composite video or digital luma and chroma signals are presented to the digital decoder 7. In a preferred implementation, decoder 7 is a Philips chipset composed of one SAA7151 Digital multi-standard decoder and one SAA7157 clock signal generator circuit. Decoder (and phase locked loop) 7 is described in more detail below with reference to FIG. 11.

Decoder 7 includes three input video processing sections: a sync stripper and phase locked loop, a chroma demodulation means, and a luminance filtering means. The sync stripper separates the horizontal and vertical sync timing edges from the incoming video. Horizontal and vertical sync are buffered out of circuit 7 and are used later in memory timing generator 9 (to be described with reference to FIG. 14).

Horizontal sync timing is used within decoder 7 as a reference for a clock generator phase locked loop. This clock is used to run the memory and output circuitry and is available at 27 MHz and 13.5 MHz. A block diagram of the phase locked loop within decoder 7 is shown in FIG. 11. The loop includes phase detector 22 (which compares the reference input H to a divided down version of the oscillator clock), filter 23, oscillator 24, and counter 25. Counter 25 can be programmed to set the output clock frequency at 13.5 MHz when the input signal has NTSC or PAL timing. The result is that there are 858 clocks per horizontal line of information, 720 of which are considered to be the active video interval and stored in memory. Because the clock is locked to the input horizontal sync and it is used to derive the memory timing and output timing, the output signal and input signal are phase coherent and no time base correction is performed on the video.

The simplified luminance path within decoder 7 includes trap filter 26 (shown in FIG. 11), which removes the chroma component of the input video signal. A disadvantage of trap 26 is it reduces the high frequency information in the video. In the SVHS mode, trap 26 is disabled and the full luminance frequency resolution is preserved.

The chroma path within decoder 7 processes and demodulates the color component part of the video signal. Quadrature demodulator 29 receives chroma through switch 27 from either of two sources: directly from the SVHS digitizer (circuit 5 of FIG. 10) or through bandpass filter 28 from the encoded video signal. Switch 27 performs source selection. Demodulator 29 is of the quadrature type and decomposes the phase encoded chroma information into U and V components. Demodulator 29 receives zero and ninety degree subcarrier signals from a phase locked loop including phase detector 31, oscillator 30, and low pass filter 32. Phase detector 31 strives to maintain a constant zero degrees of phase between the oscillator output signal and the input chroma at burst time. Therefore, a burst gate is provided to circuit 31 by sync stripper 21.

After undergoing lowpass filtering in filter 32 to remove unwanted demodulation frequencies, the U and V eight-bit data are combined in circuit 33 into a four-bit 4:1:1 subsampled word. Therefore each 12 bit output word consists of eight bits of luminance from trap 26 and four bits of chroma from combiner 33. Because the chroma U and V are subsampled, four pixels of luma are required to transfer one pixel of color. This color subsampling is not objectionable to the viewer.

With reference again to FIG. 10, memory 8 receives compressed video information in horizontal sequential format (i.e., video information comprising lines having the format shown in FIG. 9B), and temporarily stores the compressed video information for later retrieval and output in field sequential form.

Each pixel stream for a single line (such as that shown in FIG. 9B) asserted at the output of decoder 7 consists of 360 pixels from camera A, followed by 360 pixels from camera B. An entire field output from decoder 7 consists of 240 lines (NTSC) or 287 lines (PAL). The video stream output to the monitor from the display (playback) controller of FIG. 10 has "field sequential" format, in the sense that it consists of alternating fields from camera A and from camera B.

The demultiplexing from horizontal sequential format (i.e., the format of signals having horizontal lines as shown in FIG. 9B) to field sequential format (i.e., the format shown in FIG. 6A) is performed by first writing the data streams from decoder 7 into memory 8. For each data stream representing a horizontal line (of the type shown in FIG. 9B), the first portion of the data (the camera A data) is written to the lower half of the memory, and the remaining portion of the data (the camera B data) is written to the upper half. On reading the stored data from the memory, the upper half is read first, followed by the lower half. By the use of this method, the data bandwidth is constant and the multiplexed camera signals are demultiplexed in a manner suitable for display on a monitor in a left eye-right eye format.

Figure 12:
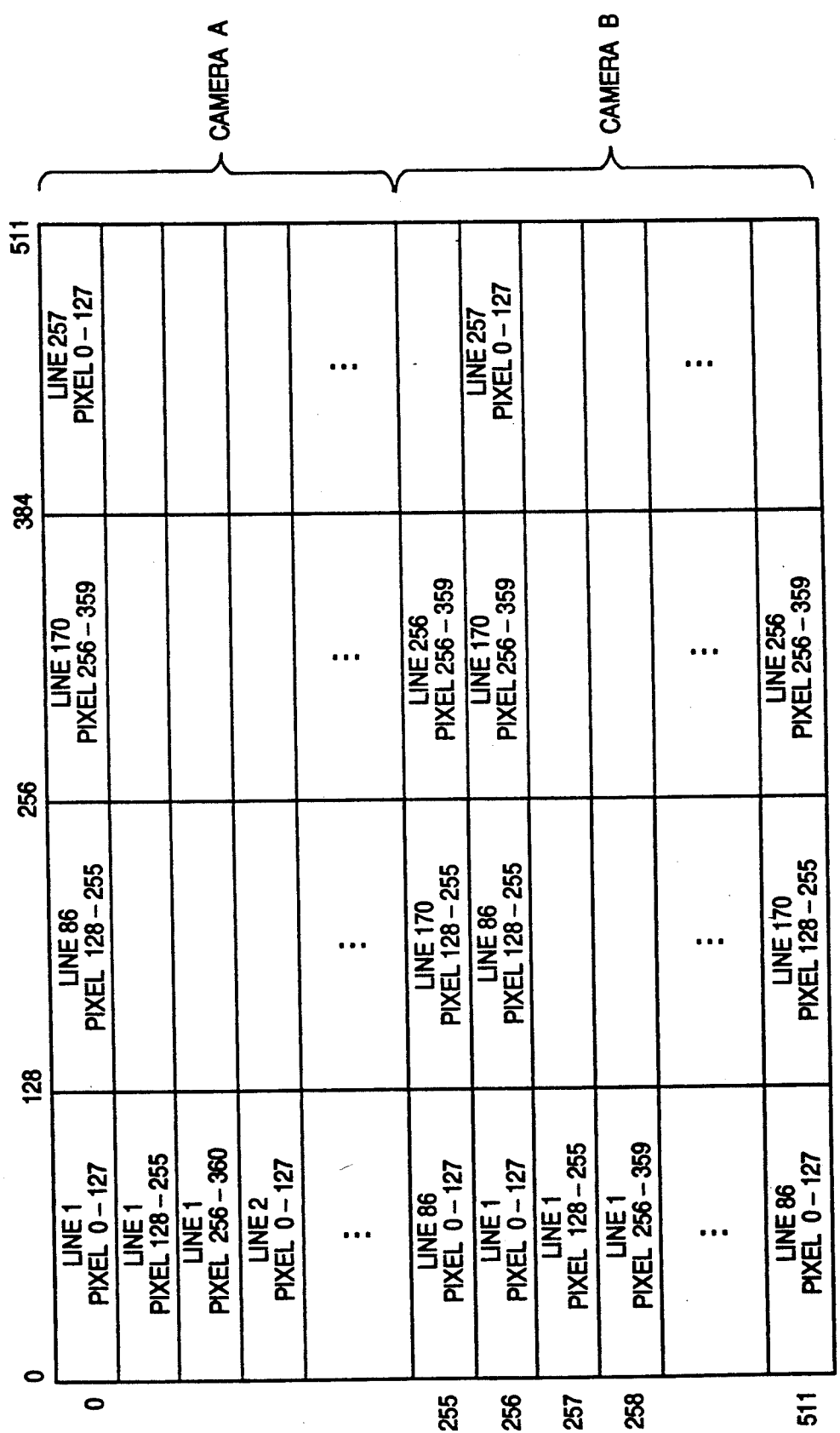
FIG. 12 is a memory allocation map showing the location of video information in VRAM storage, in a preferred embodiment of the invention. The memory is organized as 512×512 pixels by 12 bits deep.

As shown in FIG. 12, memory 8 is logically arranged as 512 by 512 pixels (by 12 bits deep). Each input video line is divided into six memory sections. Three hundred and sixty pixels of camera "A" information are stored in sections of 128, 128, and 104 pixels each. Similarly, three hundred and sixty pixels of camera "B" information are stored in sections of 128, 128, and 104 pixels each.

The first three sections represent camera A and are stored in the lower half of the memory (in rows 0, 1, and 2 of column 0). The second three sections represent camera B information and are stored in the upper half of memory (in rows 256, 257, and 258 of column 0). The memory is filled in the following order: all rows of columns 0 to 127, followed by all rows of columns 128 to 255, all rows of columns 256 to 383, and lastly all rows of columns 384 to 511 until all input data are stored. This method of writing rows eliminates the need for a separate refresh cycle.

Figure 13:
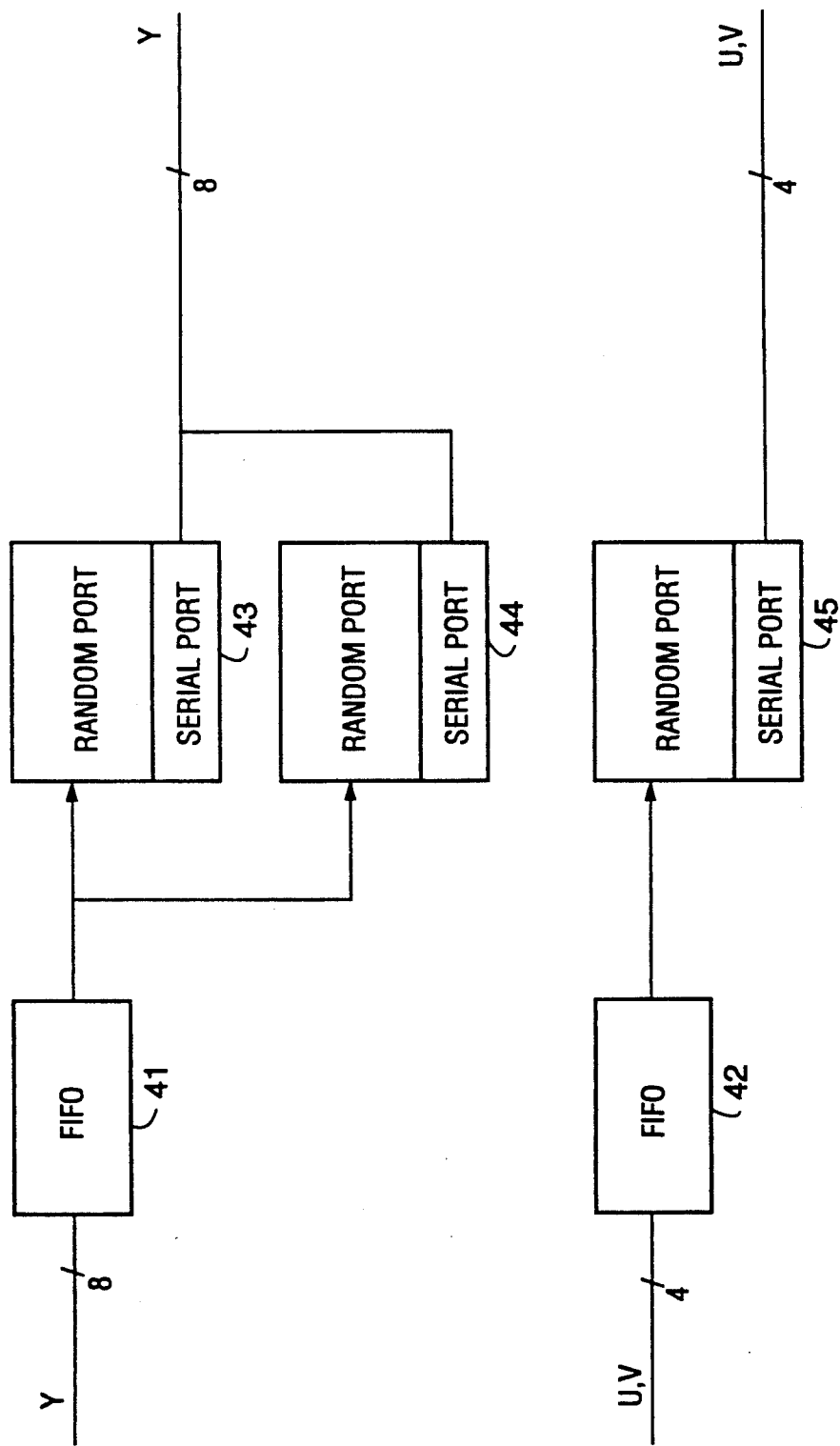
FIG. 13 is a block diagram of memory of the apparatus of FIG. 10.

With reference to FIG. 13, memory block 8 consists of FIFO sections 41 and 42 and a memory storage section comprising elements 43, 44, and 45. One field of storage requires $(360+360)*287*12=2,479,680$ bits. In the FIG. 13 implementation, each of elements 43, 44, and 45 is a 256K×4 VRAM chip, so that elements 43–45 have a total combined capacity of 3,145,728 bits. The three chips are operated in parallel, with two chips (43 and 44) allocated for the 8 bit luminance data and one chip (45) for the 4 bit chroma data. The data from decoder 7 are written into the random port of each of memory circuits 43, 44, and 45 in page mode. Using page mode, a peak bandwidth of 13.5 million writes per second (19.25 Mbytes per second) is available.

When page boundaries are crossed, the FIFO's (41 and 42) temporarily store the decoded data. Data are read out from circuits 43, 44, and 45 from the serial memory port of each of these circuits.

Address and control signals are provided to memory 8 by memory timing generator 9. Circuit 9 (to be described in detail with reference to FIG. 14) controls FIFO sections 41 and 42 and memory sections 43–45 of memory 8. Among the system constraints placed on memory timing generator controller 9 are: demultiplex the camera A and B data as described in memory sections 43–45, refresh each VRAM once during each 8 ms., operate FIFO sections 41 and 42 and the random port of each of circuits 43–45 so that no data is lost, and operate the serial port of each of circuits 43–45 so that data is output continuously. In addition, memory timing generator 9 provides the output video sync and blanking, and stereo field pulse.

Figure 14:
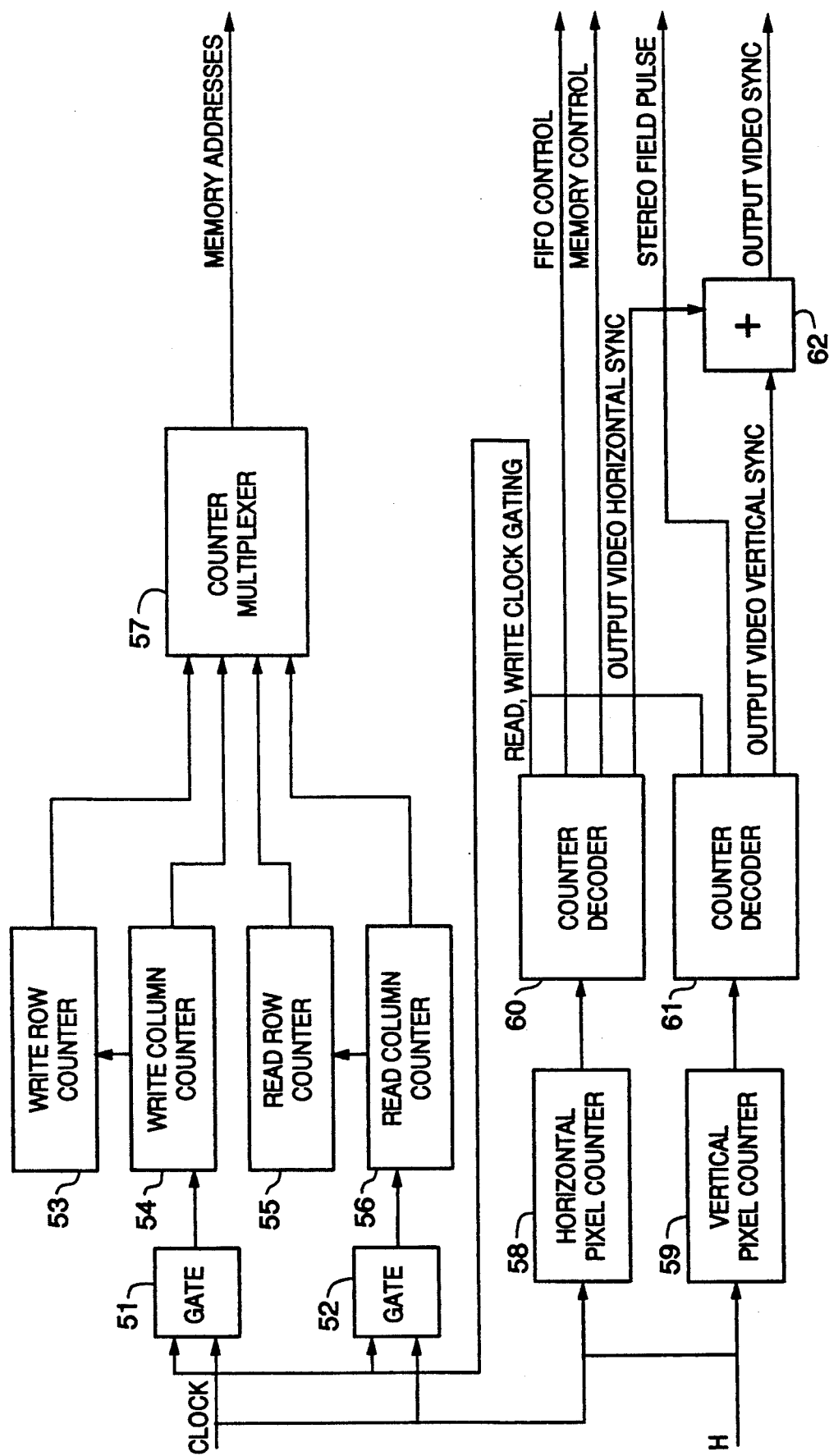
FIG. 14 shows a block diagram of a memory timing generator of the FIG. 10 apparatus, which produces the control signals for the VRAM, output video synchronizing pulses, and a stereo field pulse which synchronizes a CrystalEyes selection device.

With reference to FIG. 14, memory timing generator 9 includes counters 53, 54, 55, and 56 for generating the memory addresses, horizontal pixel counter 58, vertical pixel counter 59, and programmable decoders 60 and 61 for generating the memory and FIFO read and write control signals. Counters 53 and 54 for write rows and columns, and counters 55 and 56 for read rows and columns, provide the locations to and from which Y,U and V data are written and read. The counters are gated by circuits 51 and 52 so that only active video is stored or retrieved. The counter gating action is necessary because of special memory cycles required when crossing page boundaries and when loading the serial shift register. The timing of these special cycles is programmed into horizontal counter decoder 60 and vertical counter decoder 61. In addition, counter decoders 60 and 61 provide the output sync, blanking, and stereo field pulses. Output sync and blanking are combinations of horizontal signals, and are produced in adder 62.

With reference again to FIG. 10, color space conversion (accomplished in circuit 10) is a matrix operation which converts Y,U,V data into R,G,B form. Color space converter 10 is a Philips SAA7192 chip, in a preferred embodiment.

The digital RGB signals asserted by circuit 10 are converted to 0.7 volts peak to peak analog video in digital-to-analog convertors 11, 12, and 13. The digital-to-analog convertors have the ability to drive a RGB monitor load directly. Composite sync and stereo field information for the monitor is provided from memory timing generator 9 (described above with reference to FIG. 14).

The playback controller of FIG. 10 is designed to support a second output stage for the purpose of providing independent channels A and B for display of left and right channels on two projectors, as shown in FIG. 4, or two programs on individual monitors, as shown in FIG. 5. The second output stage can be added to an existing playback controller at a small fraction of the cost of the controller because additional VRAM memory is not required.

The operation of the playback controller changes when the second output stage is added. The playback controller becomes a single channel device which expands the channel A signal back to its original horizontal timing. The second output stage expands the channel B signal likewise back to its original horizontal timing. The channel A and B signals are then output in parallel for display on two independent monitors.

The second output stage preferably consists of a FIFO, color space convertor, and a digital-to-analog converter (DAC). The input of the FIFO is connected to the output of decoder 7 (in FIG. 10). Upon command from memory timing generator 9, the FIFO expands the channel B information from the decoder back to the standard NTSC or PAL timing. The color space converter processes the Y,U,V information into R,G,B. The DAC converts the digital R,G,B signals into analog signals for sending to the display device. The VRAM in the playback controller is set to zero delay. Therefore the signals from both the second output stage and the controller output stage video are presented to the display devices at the same time.

Figure 15B:
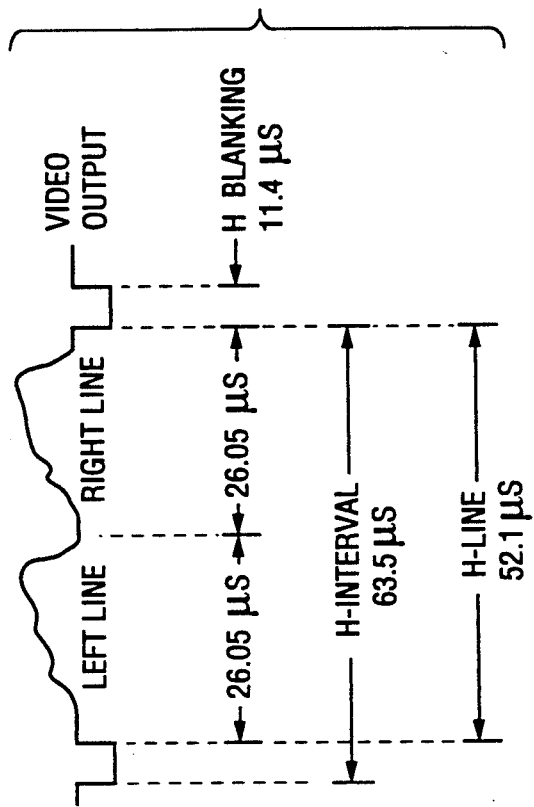
FIG. 15B is a video waveform, representing a portion of the output of the line switcher of FIG. 15A.

There are other techniques for producing or displaying stereoscopic video images compatible with the sidefield format described in this disclosure. Such techniques, through suitable adjustment and modification of cameras and video projectors, can simplify and reduce the cost of producing the desired result. I FIG. 15A, we see the setup for such a camera system, and the resulting video line output is shown in FIG. 15B. The signal of FIG. 15B satisfies the NTSC protocol. As mentioned earlier, the following explanation assumes that the signal to be displayed satisfies the NTSC protocol for didactic reasons (although the invention will work with any video standard). The subject is videographed by the left and right camera heads. The camera heads have had their electronics modified in one respect: the horizontal line frequency has been doubled so that a horizontal line is scanned in half the usual time. The usual horizontal period (the duration of an active or picture forming line plus the blanking interval) in NTSC video is 63.5microseconds. The minimum value for horizontal blanking is 11.4 microseconds, leaving 52.1 microseconds for the duration of a horizontal line. In the case of these camera heads with modified drive circuitry, a horizontal line is scanned in 26.05 microseconds. Once one horizontal line, say the horizontal line from the left camera, has been scanned, it is added to the corresponding line scanned by the right camera head which also has a duration of 26.05 microseconds. This is accomplished by feeding the two lines, the left line first and then the right line, into a multiplexer (the "line switcher" shown in FIG. 15A). The process is repeated with the addition of the H blanking signal so that the video output will be compatible with the normal NTSC protocol. When played back, as shown on the monitor in FIG. 15B, the two images will appear to be squeezed in the horizontal direction and will be completely compatible with the format described in this disclosure. The important advantage here is that if the cameras are dedicated to perform in the stereoscopic mode, or possibly switchable to perform in the stereoscopic mode, the video multiplexer may be omitted.

The selection of which line, left or right, to be the first is arbitrary. It is important, however, to maintain the standard once a choice has been made. Moreover, the context of this disclosure is for moving images, however, it should be obvious to a person skilled in the art that the virtues of the approach described here are such that they may as well be applied to a still image video camera.

As is shown in FIG. 15B, a left line which is 26.05 microseconds is added to a right line which is 26.05 microseconds to form a video line of picture information which is 52.1 microseconds long. This is compatible with the multiplexing technique described in this disclosure. Because the other parameters of the video protocol remain unchanged, i.e., the vertical frequency has not been modified, the number of scanned lines remains the same, and the position of the horizontal and vertical sync blanking signals remains in the standard position for NTSC, the signal may be recorded on a standard recorder or transmitted over an NTSC transmission line.

Figure 15A:
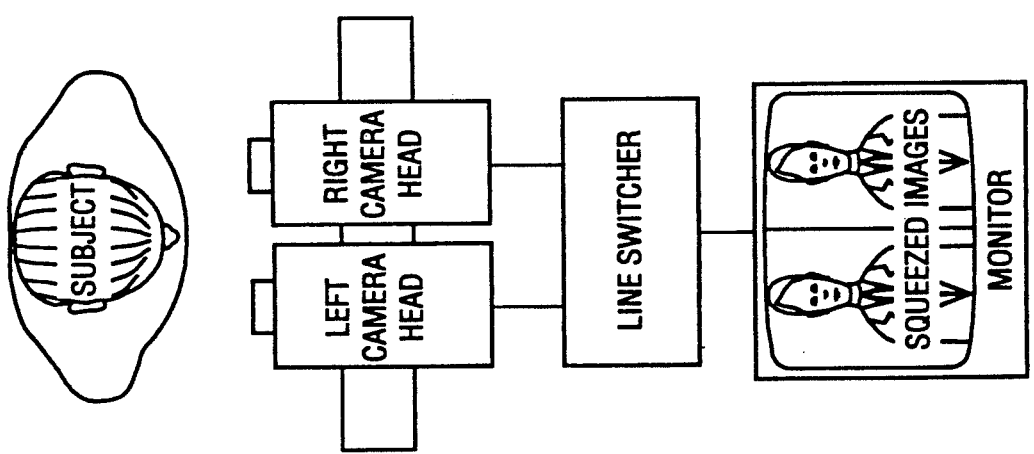
FIG. 15A is a schematic of the left and right camera heads of a stereoscopic camera, each operating at twice the horizontal frequency to produce the stereoscopic format of the present invention.

When played back as shown in FIG. 15A, on a standard monitor, the result will be two horizontally squeezed images. When played back through the display controller which is the subject of this disclosure and on a stereo-ready 120 field/second monitor, the result is a field sequential stereoscopic image ready to be viewed with the appropriate selection device.

Using an approach which is related to that which has been described immediately above, it is possible to play back stereoscopic images using video projectors, as is shown with the help of FIGS. 16A through 16E, 17, and 18. We call this a "dual output" scheme for stereoscopic display with two projectors or display means such as a virtual reality stereoscope. The "side by side" compression scheme proposed here leads to this interesting and useful variation. The "above and below" subfield scheme disclosed in U.S. Pat. No. 4,523,226 depends upon the display device scanning at twice the vertical rate of the source for deanamorphosis of the images. Electronic means are used to add the vertical timing synchronization signals required. The present sidefield scheme allows for the deanamorphosis of the horizontal compression by running the display means at twice the horizontal rate, with appropriate horizontal timing added by electronic techniques.

By running the horizontal rate of the display devices at twice the source rate and adding horizontal timing pulses to the signal meant for the second device, the "stretch" of the display device will match the compression of the source as shown in FIG. 15, producing an image of the desired aspect ratio. By using a fast video demultiplexer, two separate video signals are produced and each is sent to the appropriate display devices.

Figure 16A:
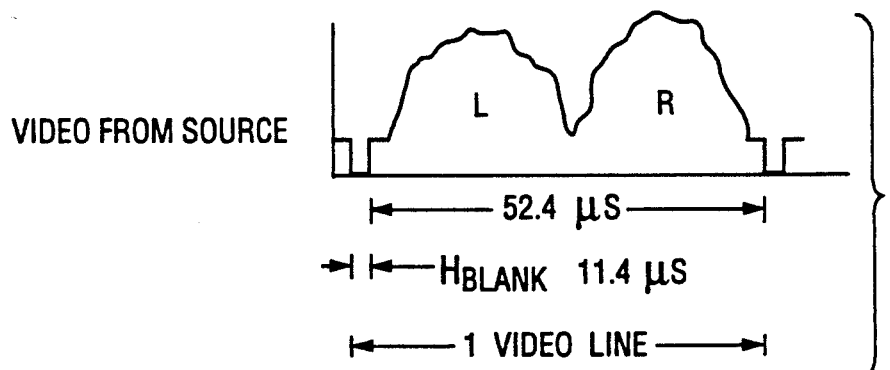
FIG. 16A represents one active line (H) of a video type signal with two channels horizontally compressed as described in this disclosure.
Figure 16B:
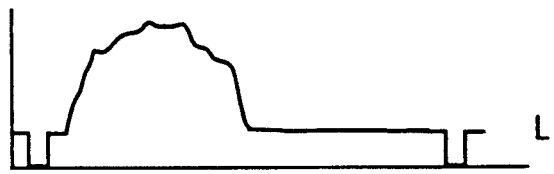
FIG. 16B represents a first output of a 1:2 demultiplexer which receives the FIG. 16A signal. The signal of FIG. 16B comprises the existing horizontal sync signal and the first (left) video signal, which has an active picture display time of about H/2.
Figure 16C:
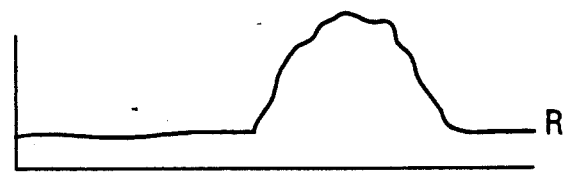
FIG. 16C represents a second (right) video signal output from the same demultiplexer mentioned with reference to FIG. 16B.

Referring to FIG. 16A, we show one active line (H) of a video signal with two channels horizontally compressed following the teachings of this disclosure. Using the existing horizontal sync as a time reference, this signal goes to a precisely timed 1:2 demultiplexer (i.e., the video switch shown in FIG. 17). FIG. 16B illustrates a trace of the first output of the demultiplexer and comprises the existing horizontal sync signal and the first (left) video signal, which has an active picture display time of about H/2. FIG. 16C shows the second (right) video signal from the same demultiplexer. It is also about H/2) in duration, but lacks horizontal sync information. The same timing and delay circuits (shown in FIG. 17) used to control the demultiplexer are employed to produce the signal of FIG. 16D from that of FIG. 16C, by creating and adding a new horizontal timing or sync signal at the correct time. Slight variations in this insertion time will allow a range of "horizontal shift" of the image for stereoscopic image alignment adjustments.

Figure 16D:
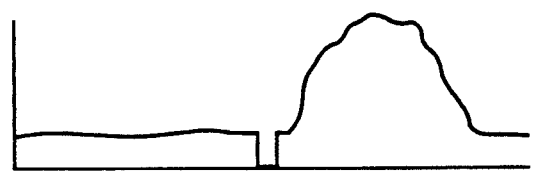
FIG. 16D represents the second (right) video signal of FIG. 16C with a horizontal synchronization signal added electronically.
Figure 16E:
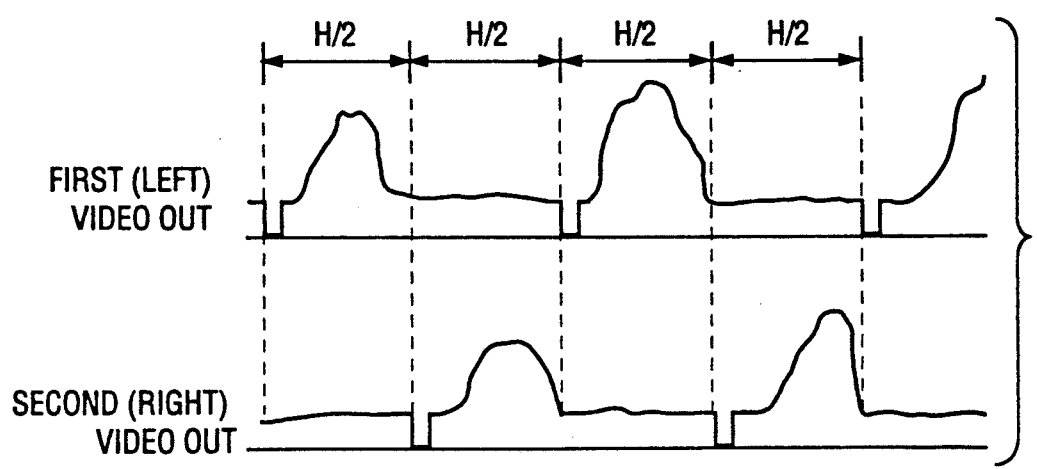
FIG. 16E shows the timing relationship of the two signals of FIG. 16B and FIG. 16C and their sync signals.
Figures 17, 18:
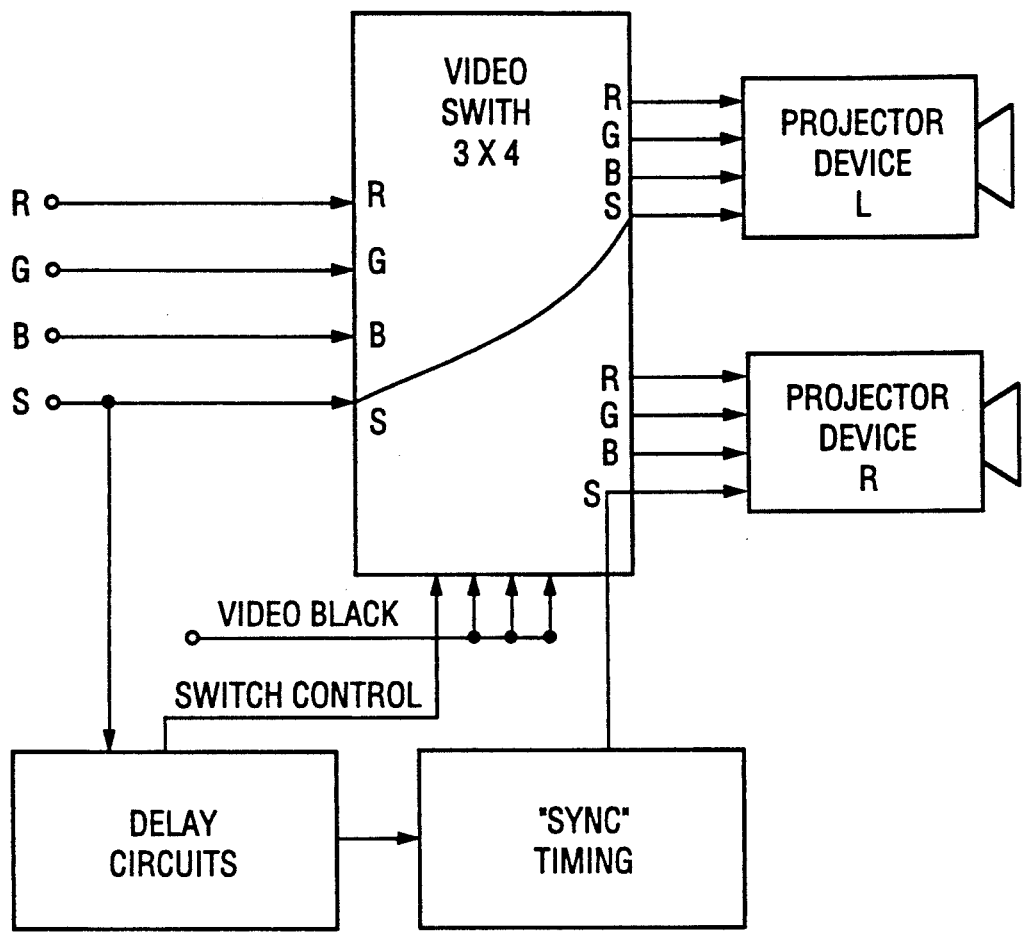
FIG. 17 is a block diagram of a means for implementing the scheme described with reference to FIGS. 16A through 16E, for an RGB source, such as a computer.
FIG. 18 is a diagram representing a typical demultiplexer signal scheme with all timing referenced to horizontal sync from the source equipment.

FIG. 16E shows the timing relationship of the two outputs of the video switch of FIG. 17 and their sync signals (i.e., the signals of FIGS. 16B and 16D). With two video projectors (shown in FIG. 17) projecting on the same screen, using the same selection technique of polarized light, as described with reference to FIG. 4, the result is lines which are presented sequentially at nominally 60 fields/second/eye. First the left line (i.e., the signal of FIG. 16B) is written by the left projector, then the corresponding right line (the signal of FIG. 16D) is written by the right projector. By adding additional memory and circuitry at each output, the projector (or display devices) of FIG. 17 could produce continuous images at any refresh rate, but this isn't needed for most applications.

In a practical implementation of this invention, it is required to maintain a constant "video black" signal level during the (H/2) time when there is no active video on each channel (accordingly, FIG. 17 shows that a "video black" signal is supplied to the video switch). When there is active video on a channel, appropriate video DC restoration or "clamping" is required. These techniques will prevent black level shifts leading to the possibility of contrast mismatch between the left and right channels and image flicker.

This technique will work not only for video protocols such as NTSC, it will also work for component or composite video, or computer generated images (i.e., the system of FIG. 17 could be used to process input signals of any of these types).

Figure 8:
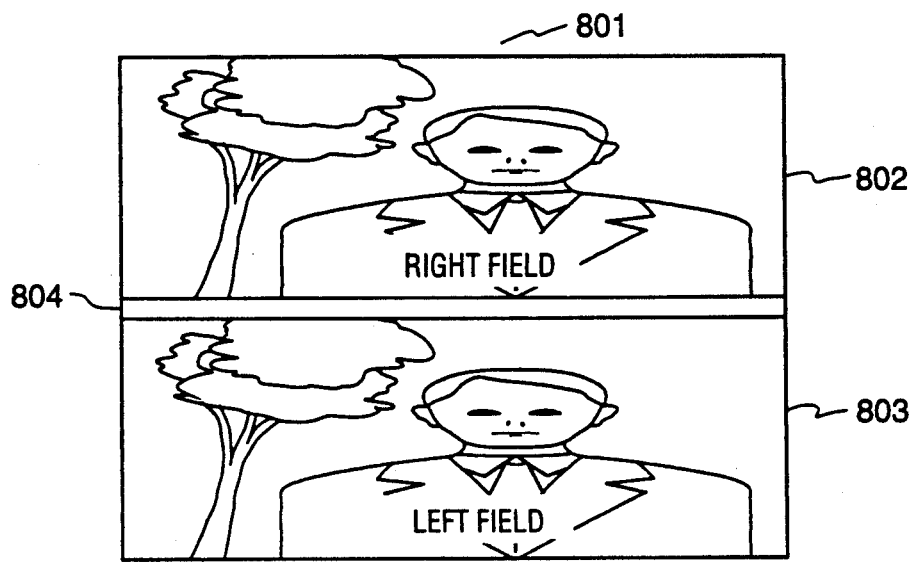
FIG. 8 represents a conventionally multiplexed stereoscopic video signal as it would appear when displayed on a conventional monitor, with vertically compressed images in an over-and-under format.

A typical demultiplexer signal sequence implemented by the FIG. 17 apparatus is shown in FIG. 8. All timing is referenced to horizontal sync from the source equipment.

We claim:

1. A method for time multiplexing a first video signal comprising horizontal lines and a second video signal comprising horizontal lines, including the steps of:
   horizontally compressing the horizontal lines of the fist video signal to generate first compressed line signals;
   horizontally compressing the horizontal lines of the second video signal to generate second compressed line signals; and
   generating a multiplexed video signal comprising multiplexed line signals, wherein each of the multiplexed line signals consist of a first number of sample of one of the first compressed line signals concatenated with said first number of samples of one of the second compressed line signals.

2. The method of claim 1, wherein the multiplexed video signal has a conventional video bandwidth.

3. The method of claim 1, wherein the multiplexed video signal represents a stereoscopic image, the first video signal represents a first perspective viewpoint of the stereoscopic image, and the second video signal represents a second perspective viewpoint of the stereoscopic image.

4. The method of claim 1, also including the step of:
   displaying the multiplexed video signal on a monitor, to produce side-by-side first and second subfield images.

5. The method of claim 1, wherein the multiplexed video signal represents a nonstereoscopic image, the first video signal represents a first planar image, and the second video signal represents a second planar image.

6. The method of claim 1, wherein the multiplexed video signal and the multiplexed line signals include no horizontal sync blanking area and no horizontal sync pulse.

7. A method for time multiplexing a first video signal comprising horizontal lines and a second video signal comprising horizontal lines, including the steps of:
   horizontally compressing the horizontal lines of the first video signal to generate first compressed line signals;
   horizontally compressing the horizontal lines of the second video signal to generate second compressed line signals;
   generating a multiplexed video signal comprising multiplexed line signals, wherein each of the multiplexed line signals consists of one of the first compressed lien signals concatenated with one of the second compressed line signals; and
   generating a field-sequential video signal from the multiplexed video signal by expanding and demultiplexing the multiplexed line signals.

8. The method of claim 7, wherein the field-sequential video signal includes a first data stream comprising an expanded version of each of the first compressed line signals, followed by a second data stream comprising an expanded version of each of the second compressed line signals.

9. The method of claim 7, also including the step of:
   displaying the field-sequential video signal on a monitor, to produce a field-sequential stereoscopic video image.

10. The method of claim 7, wherein each of the first video signal and the second video signal represents a frame.

11. The method of claim 10, wherein the field-sequential video signal includes a first data stream representing a first odd field, followed by a second data stream representing a second odd field, followed by a third data stream representing a first even field, followed by a fourth data stream representing a second even field.

12. A method for time multiplexing a first video signal comprising horizontal liens and a second video signal comprising horizontal lines, including the steps of:
   horizontally compressing the horizontal lines of the first video signal to generate first compressed line signals;
   horizontally compressing the horizontal lines of the second video signal to generate second compressed line signals;
   generating a multiplexed video signal comprising multiplexed line signals, wherein each of the multiplexed line signals consists of one of the first compressed lien signals concatenated with one of the second compressed line signals;
   storing the multiplexed video signal;
   generating reproduced multiplexed line signals by plying back the stored multiplexed video signal; and
   expanding and demultiplexing the reproduced multiplexed line signals to generate a field-sequential video signal.

13. The method of claim 12, wherein the step of expanding the reproduced multiplexed line signals includes the steps of:
   generating first horizontally expanded signals corresponding to the first compressed line signals; and
   generating second horizontally expanded signals corresponding to the second compressed line signals, wherein the field-sequential video signal includes a first data stream comprising the first horizontally expanded signals, followed by a second data stream comprising the second horizontally expanded signals.

14. The method of claim 12, wherein each of the first video signal and the second video signal represents a frame, and wherein the field-sequential video signal includes a first data stream representing a first odd field, followed by a second data stream representing a second odd field, followed by a third data stream representing a first even field, followed by a fourth data stream representing a second even field.

15. An apparatus for time multiplexing a first video signal comprising horizontal lines and a second video signal comprising horizontal lines, including:
   a means for horizontally compressing the horizontal lines of the first video signal to generate first compressed line signals and for horizontally compressing the horizontal liens of the second video signal to generate second compressed line signals; and a multiplexing means for generating a multiplexed video signal comprising multiplexed line signals, wherein each of the multiplexed line signals consists of a first number of samples of one of the first compressed lien signals concatenated with said first number of sample of one of the second compressed line signals.

16. The apparatus of claim 15, also including:

a recording and playback means, for recording the multiplexed video signal, and generating reproduced multiplexed line signals by playing back the recorded multiplexed video signal; and a demultiplexing means, connected to the recording and playback means, and including a means for expanding and demultiplexing the reproduced multiplexed lien signals to generate a field-sequential video signal.

17. The apparatus of claim 16, wherein the reproduced multiplexed line signals have a conventional video bandwidth, and also including:

a transmission link for transmitting data having said conventional video bandwidth, said transmission link connected between an output of the recording and playback means and an input of the demultiplexing means.

18. The apparatus of claim 15, wherein the multiplexed video signal has a conventional video bandwidth.

19. The apparatus of claim 18, also including:

a demultiplexing means which includes means for converting the multiplexed video signal into a field-sequential video signal by expanding and demultiplexing the multiplexed line signals; and a transmission link for transmitting data having said conventional video bandwidth, wherein the transmission link is connected between an output of the multiplexing means and an input of the demultiplexing means.

20. The apparatus of claim 19, wherein the field-sequential video signal is a stereoscopic video signal including a first data stream representing a first odd field, followed by a second data stream representing a second odd field, followed by a third data stream representing a first even field, followed by a fourth data stream representing a second even field.

21. The apparatus of claim 19, wherein the demultiplexing means includes means for generating first horizontally expanded signals corresponding to the first compressed line signals, and for generating second horizontally expanded signals corresponding to the second compressed line signals, and wherein the field-sequential video signal includes a first data stream comprising the first horizontally expanded signals, followed by a second data stream comprising the second horizontally expanded signals.

22. An apparatus for processing time multiplexed line signals for display, wherein each of the multiplexed line signals consists of a first compressed line signal concatenated with a second compressed line signal, wherein the first compressed line signals represent a first video signal, and wherein the second compressed line signals represent a second video signal, including:

a means for demultiplexing the multiplexed line signals to separate the first compressed line signals from the second compressed line signals; and a means for generating horizontally expanded first compressed line signals and horizontally expanded second compressed line signals from the separated first compressed line signals and the separated second compressed line signals, and for combining the horizontally expanded first compressed line signals and the horizontally expanded second compressed line signals to generate a field-sequential video signal.

23. The apparatus of claim 22, wherein the field-sequential video signal includes a first data stream comprising the horizontally expanded first compressed line signals, followed by a second data stream comprising the horizontally expanded second compressed line signals.

24. The apparatus of claim 22, wherein each of the first video signal and the second video signal represents a frame, and wherein the field-sequential video signal includes a first data stream representing a first odd field, followed by a second data stream representing a second odd field, followed by a third data stream representing a first even field, followed by a fourth data stream representing a second even field.

25. An apparatus for processing time multiplexed line signals for display, wherein each of the multiplexed line signals consists of a first compressed data stream concatenated with a second compressed data stream, wherein the first compressed data streams represent a first video signal, and wherein the second compressed data streams represent a second video signal, including:

a memory means having storage locations which map into a grid of rows and columns;

a write means for writing the first compressed data streams into a first set of row locations of the memory means at a first data rate, and for writing the second compressed data streams into a second set of row locations of the memory means at said first data rate; and a read means for reading the data stored in the first set of row locations at a second data rate lower than said first data rate, and thereafter reading the data stored in the second set of row locations at the second data rate, to generate a field-sequential video signal.

26. The apparatus of claim 25, wherein the storage locations map into a grid of rows and columns defining a 512×512 pixel array, wherein each of the first and the second compressed data streams comprises three sections of 128 pixels.

27. The apparatus of claim 25, wherein each of the first video signal and the second video signal represents a frame, and wherein the field-sequential video signal includes a first data stream representing a first odd field, followed by a second data stream representing a second odd field.

28. The apparatus of claim 27, wherein the field-sequential video signal includes a first data stream representing a first odd field, followed by a second data stream representing a second odd field, followed by a third data stream representing a first even field, followed by a fourth data stream representing a second even field.

29. An apparatus for processing time multiplexed lien signals for display, wherein each of the multiplexed lien signals consist of a first number of samples of a first compressed data stream concatenated with said first number of sample of a second compressed data stream, wherein the first compressed data streams represent a first video signal, and wherein the second compressed data streams represent a second video signal, including:

a demultiplexing means for receiving the time multiplexed line signals and processing the time multiplexed line signals to produce parallel first and second channels of video information;

first projection means for receiving the first channel of video information and projecting a first video image representing said firs channel; and second projection means for receiving the second channel of video information and projecting a second video image representing said second channel.

30. The apparatus of claim 29, also including:

a first polarizing filter for imposing a first polarization characteristic on the projected first video image; and a second polarizing filter for imposing a second polarization characteristic on the projected second video image.

31. A method for time multiplexing a first video signal comprising horizontal lines and a second video signal comprising horizontal lines, including the steps of:

discarding selected pixels comprising each of the horizontal lines of the first video signal to generate first partial lien signals;

discarding selected pixels comprising each of the horizontal lines of the second video signal to generate second partial line signals; and generating a multiplexed video signal having a bandwidth substantially identical to that of the first video signal, wherein the multiplexed video signal comprises multiplexed line signals, and wherein each of the multiplexed line signals consists of a first number of sample of one of the first partial line signals concatenated with said first number of samples of one of the second partial line signals.

32. An apparatus for processing time multiplexed line signals for display, wherein each of the time multiplexed line signals consists of a first compressed data stream concatenated with a second compressed data stream, wherein the first compressed data streams represent a first video signal, and wherein the second compressed data streams represent a second video signal, including:

a first-in-first-out memory means for receiving the time multiplexed line signals; and a read means for reading a field-sequential video signal from the memory means.

33. The apparatus of claim 32, also including:

a color space conversion means for receiving the field-sequential video signal, and generating a field-sequential RGB video signal from the field-sequential video signal.

* * * * *